US 6,659,876 B2

(12) United States Patent
Hashimoto

(10) Patent No.: US 6,659,876 B2
(45) Date of Patent: Dec. 9, 2003

(54) DAMPER MECHANISM

(75) Inventor: Yasuyuki Hashimoto, Neyagawa (JP)

(73) Assignee: Exedy Corporation, Osaka (JP)

( * ) Notice: Subject to any disclaimer, the term of this patent is extended or adjusted under 35 U.S.C. 154(b) by 38 days.

(21) Appl. No.: 10/085,148

(22) Filed: Mar. 1, 2002

(65) Prior Publication Data
US 2002/0128073 A1 Sep. 12, 2002

(30) Foreign Application Priority Data
Mar. 9, 2001 (JP) ........................................ 2001-067421

(51) Int. Cl.[7] .............................. F16D 3/66; F16D 3/14
(52) U.S. Cl. .................................... 464/68; 192/213.22
(58) Field of Search ...................... 192/213.21, 213.22, 192/213.11, 213.12; 464/68, 66, 64, 63, 67, 83

(56) References Cited

U.S. PATENT DOCUMENTS

| | | | | |
|---|---|---|---|---|
| 1,861,251 A | * | 5/1932 | Wemp | 192/70.18 |
| 4,585,428 A | * | 4/1986 | Asada | 464/68 |
| 4,645,053 A | * | 2/1987 | Kitayama | 192/213.31 |
| 4,729,465 A | * | 3/1988 | Reik | 74/574 |
| 4,908,004 A | * | 3/1990 | Graton et al. | 464/68 |
| 4,924,990 A | * | 5/1990 | Takeuchi | 192/201 |
| 5,609,526 A | * | 3/1997 | Kitayama et al. | 464/68 |
| 5,653,639 A | * | 8/1997 | Gassmann | 464/24 |
| 5,711,407 A | * | 1/1998 | Maier | 192/201 |
| 6,270,417 B1 | | 8/2001 | Hashimoto | |
| 6,375,575 B2 | | 4/2002 | Hashimoto | |
| 2002/0128073 A1 | * | 9/2002 | Hashimoto | 464/68 |
| 2003/0045362 A1 | * | 3/2003 | Aokt et al. | 464/68 |

* cited by examiner

Primary Examiner—Lynne H. Browne
Assistant Examiner—Kenneth Thompson
(74) Attorney, Agent, or Firm—Shinjyu Global IP Counselors, L LLP

(57) ABSTRACT

A clutch disk assembly has an input rotary member 2, a spline hub 3, a damper section 4, a friction mechanism 13, and a friction suppressing mechanism. The damper section 4 has second springs 8 and a torsion characteristic having a positive side corresponding to when the input rotary member 2 is twisted in a rotational drive direction with respect to the spline hub 3 and a negative side corresponding to when the input rotary member 2 is twisted in an opposite direction. The friction mechanism 13 can generate friction when the input rotary member 2 and the spline hub 3 undergo relative rotation and the second springs 8 exert an elastic force. The friction suppressing mechanism secures a rotational gap θACn on only the positive or negative side preventing the second spring 8 from acting on the friction mechanism within a prescribed angular range.

19 Claims, 22 Drawing Sheets

DAMPER MECHANISM

BACKGROUND OF THE INVENTION

1. Field of the Invention

The present invention relates to a damper mechanism. More specifically, the present invention relates to a damper mechanism that damps torsional vibrations in a power transmission system.

2. Background Information

Clutch disk assemblies used in vehicles function as a clutch for engaging and disengaging the flywheel to facilitate the transfer of torque from an engine. Clutch disk assemblies also function as a damper mechanism for absorbing and damping torsional vibrations from the flywheel. In general, vehicle vibrations include idling-related noises such as rattling sounds, traveling-related noises such as rattling associated with acceleration and deceleration and muffled noises, and tip-in-tip-out or low frequency vibrations. The damper function of the clutch disk assembly is provided ideally to eliminate these noises and vibrations.

Idling-related noises are rattling noises that emit from the transmission when the gearshift is put into neutral and the clutch pedal is released. For example, while waiting at a traffic light a driver might shift the gear into neutral, causing the transmission to rattle. When the engine is running at a speed in the vicinity of idling speed, the engine torque is relatively low and the torque change at the time of power stroke explosion is relatively large. Thus, the aforementioned noises are caused. Under these conditions, the teeth of the transmission input gear and counter gear undergo a phenomenon of striking against one another.

Tip-in and tip-out or low frequency vibrations refer to large-scale lengthwise shaking of the vehicle that occurs when the accelerator pedal is depressed or released suddenly. If the rigidity of the drive transmission system is low, the torque transmitted to the tires is transmitted back from the tires as torque and the resulting lurching reaction causes excessive torque to be generated at the tires. As a result, longitudinal vibrations occur that shake the vehicle excessively back and forth.

In the case of idling noises, the problem lies in the zero torque region of the torsion characteristic of the clutch disk assembly. This problem is alleviated if the torsional rigidity is low. Conversely, it is necessary for the torsion characteristic of the clutch disk assembly to be as rigid as possible to suppress the longitudinal vibrations caused by tip-in and tip-out.

In order to solve this problem, a clutch disk assembly has been proposed which has a two-stage characteristic obtained by using two types of spring members. The first stage or low twisting angle region of the torsion characteristic has a relatively low torsional rigidity and low hysteresis torque, and provides a noise preventing effect during idling. Meanwhile, the second stage or high twisting angle region of the torsion characteristic has a relatively high torsional rigidity and high hysteresis torque. Thus, the second stage is sufficiently capable of damping the longitudinal vibrations of tip-in and tip-out.

A damper mechanism that efficiently absorbs small torsional vibrations during the second stage of the torsion characteristic is also known. By not allowing the large friction mechanism of the second stage to operate when small torsional vibrations are inputted due to such factors as combustion fluctuations in the engine the damper mechanism absorbs small torsional vibrations.

In order to prevent the large friction mechanism of the second stage from operating when small vibrations are transmitted due to, for example, engine combustion fluctuations while the damper mechanism is in the second stage of its torsion characteristic, it is necessary for the high-rigidity spring member to be compressed and for a rotational gap of a prescribed angle to be secured between the high-rigidity spring member and the large friction mechanism. The angular magnitude of this rotational gap is small, i.e., approximately 0.2 to 1.0 degrees. The rotational gap exists in both the positive side second stage and the negative side second stage. The positive side second stage corresponds to when the input plate (input rotary member) is twisted in the rotational drive or positive direction with respect to the spline hub (output rotary member). The negative side second stage corresponds to when the input plate is twisted in a direction opposite the rotational drive direction (negative direction) with respect to the spline hub. Conventionally, the rotational gap is achieved using the same mechanism on both the positive side second stage and the negative side second stage. Consequently, a rotational gap is always produced on both the positive twisting side and the negative twisting side of the torsion characteristic. Further, the angular magnitude of the gap is identical on both sides. However, there are situations where it is preferred that the magnitude of the rotational gap be different on the positive and negative sides of the torsion characteristic. It is also possible to have a situation where it is desirable not to provide the rotational gap at all on one side, i.e., either the positive side or the negative side.

More specifically, it is necessary to have a rotational gap on the negative side of the torsion characteristic in order to reduce the peak vibrations that occur at resonance rotational speed during deceleration. However, in FF vehicles, the resonance peak often remains in the region of practical engine speeds. Further, the noise and vibration control in the vicinity of the resonance rotational speed worsen if a rotational gap is provided on the positive side of the torsion characteristic.

In view of the above, there exists a need for a damper mechanism that overcomes the above-mentioned problems in the prior art. This invention addresses this need in the prior art as well as other needs, which will become apparent to those skilled in the art from this disclosure.

SUMMARY OF THE INVENTION

An object of the present invention is to improve the noise and vibration controls of a damper mechanism having a low-hysteresis-torque generation gap as a measure against small torsional vibrations.

A damper mechanism in accordance with a first aspect of the present invention is configured to be used in a vehicle transmission system, preferably a power transmission system to facilitate the transfer of torque from an engine flywheel. The damper mechanism is also configured to dampen and absorb torsional vibrations from the flywheel. The damper mechanism has an input rotary member, an output rotary member, a damper section, a friction mechanism, and a friction suppressing mechanism. The output rotary member is arranged such that it can rotate relative to the input rotary member. The damper section has an elastic member, preferably a spring, and a torsion characteristic. The elastic or spring member rotationally couples the input rotary member and output rotary member together. The torsion characteristic has a positive side and a negative side. The positive side corresponds to the input rotary member being twisted in a rotational drive direction with respect to the output rotary member. The negative side corresponds to the input rotary member being twisted in a direction opposite the rotational drive direction with respect to the output rotary member. The friction mechanism can generate friction when the input rotary member and output rotary member undergo relative rotation and the spring member exerts an elastic force. The friction suppressing mechanism secures a rotational gap on one side only, i.e., the positive side or the negative side, of the torsion characteristic to prevent the elastic force of the spring member from acting on the friction mechanism within a prescribed angular range.

The friction suppressing mechanism of this damper mechanism secures a rotational gap to prevent the friction mechanism from operating on only the positive side or only the negative side of the torsion characteristic. Thus, the noise and vibration controls of the vehicle during both acceleration and deceleration are enhanced because the rotational gap is provided on either the positive side or the negative side of the torsion characteristic, depending on the characteristics of the vehicle.

A damper mechanism in accordance with a second aspect of the present invention is the damper mechanism of the first aspect, wherein the friction suppressing mechanism secures the rotational gap only on the negative side of the torsion characteristic. In this damper mechanism, the rotational gap for preventing the friction mechanism from operating is provided only on the negative side of the torsion characteristic. Thus, deterioration of the noise and vibration controls in the vicinity of the resonance rotational speed on the positive side is suppressed when this damper mechanism is used in, for example, a FF vehicle for which the resonance peak remains in the region of practical engine speeds. As a result, the noise and vibration controls of the vehicle during both acceleration and deceleration are improved.

A damper mechanism in accordance with a third aspect of the present invention is configured to be used in a vehicle transmission system, preferably a power transmission system to facilitate the transfer of torque from an engine flywheel. The damper mechanism is also configured to damper torsional vibrations from the flywheel. The damper mechanism has an input rotary member, an output rotary member, a damper section, a friction mechanism, and a friction suppressing mechanism. The output rotary member is disposed such that it can rotate relative to the input rotary member. The damper mechanism has a spring member and a torsion characteristic. The spring member rotationally couples the input rotary member and output rotary member together. The torsion characteristic has a positive side and a negative side. The positive side corresponds to the input rotary member being twisted in a rotational drive direction with respect to the output rotary member. The negative side corresponds to the input rotary member being twisted in a direction opposite the rotational drive direction with respect to the output rotary member. The torsion characteristic also has a first stage and a second stage. The second stage corresponds to the spring member being compressed. Further, the second stage has a higher rigidity than the first stage. A second stage exists on both the positive side and the negative side of the torsion characteristic. The friction mechanism can generate friction when the input rotary member and output rotary member rotate relative to each other within the second stage. Further, the spring member exerts an elastic force. The friction suppressing mechanism secures a rotational gap at only the second stage on the positive side or the second stage on the negative side of the torsion characteristic to prevent the elastic force of the spring member from acting on the friction mechanism within a prescribed angular range.

The friction suppressing mechanism of this damper mechanism secures a rotational gap to prevent the friction mechanism from operating in the second stage on only the positive side or only the negative side of the torsion characteristic. Thus, the damper mechanism can improve the noise and vibration controls of the vehicle during both acceleration and deceleration by providing the rotational gap at either the second stage on the positive side or the second stage on the negative side of the torsion characteristic in accordance with the preferred characteristics of the vehicle.

A damper mechanism in accordance with a fourth aspect of the present invention is the damper mechanism of the third aspect, wherein the friction suppressing mechanism secures the rotational gap only in the second stage on the negative side of the torsion characteristic. In this damper mechanism, the rotational gap for preventing the friction mechanism from operating is provided only for the second stage on the negative side of the torsion characteristic. Thus, deterioration of the noise and vibration controls in the vicinity of the resonance rotational speed on the positive side is suppressed when this damper mechanism is used in, for example, a FF vehicle for which the resonance peak remains in the region of practical engine speeds. As a result, the noise and vibration controls of the vehicle during both acceleration and deceleration are improved.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
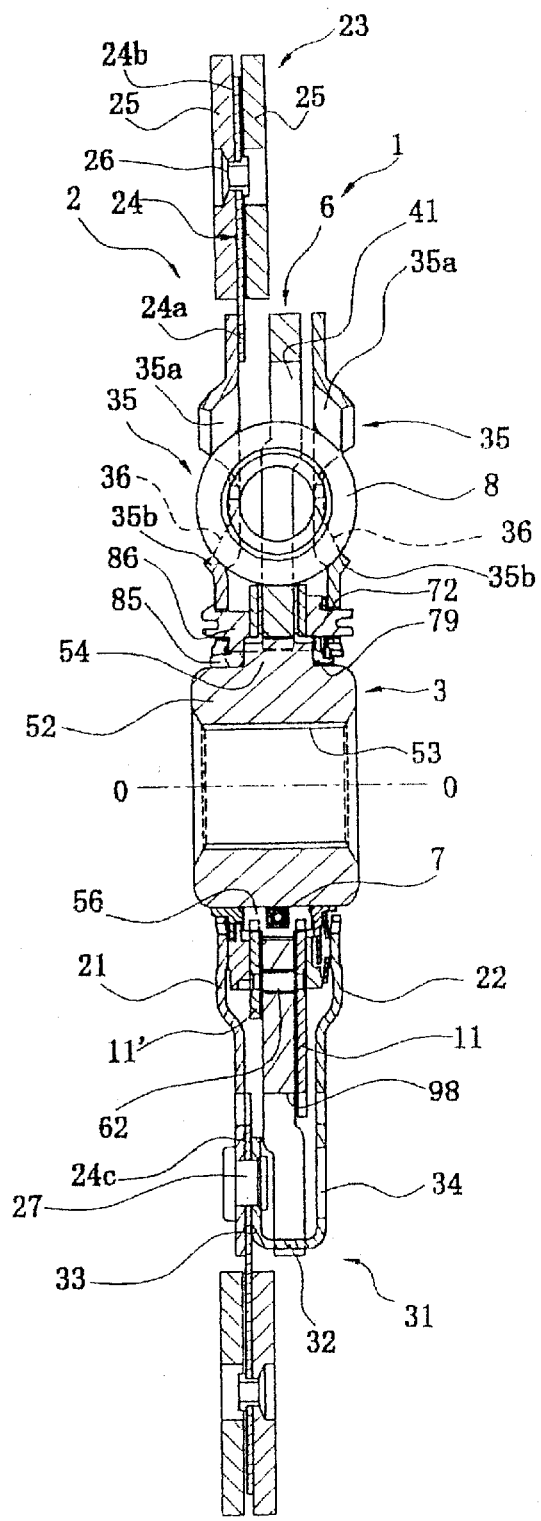
FIG. 1 is a vertical cross-sectional schematic view of a clutch disk assembly in accordance with a preferred embodiment of the present invention.
Figure 2:
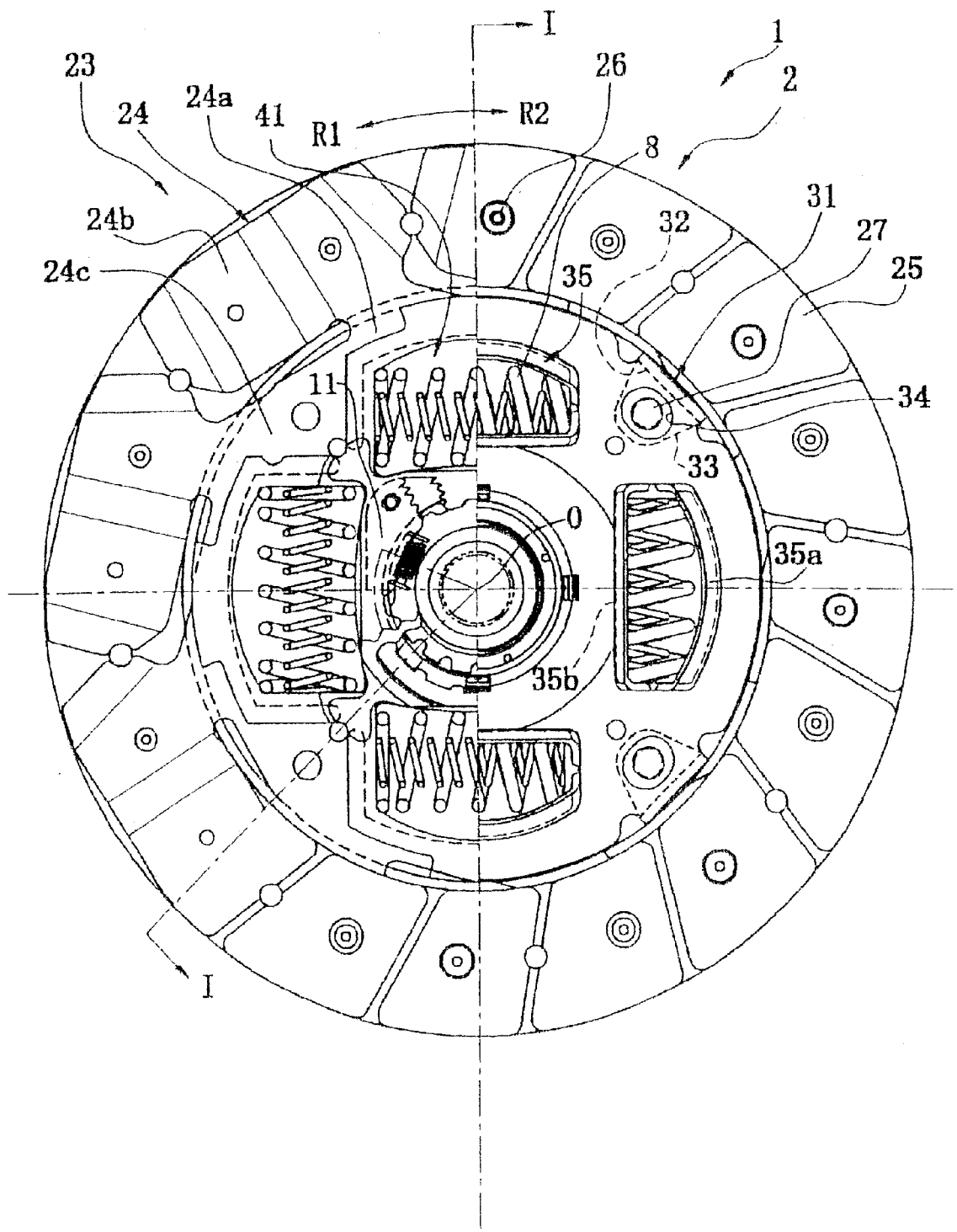
FIG. 2 is an elevational view of the clutch disk assembly of FIG. 1.

FIG. 1 illustrates a cross-sectional view of a clutch disk assembly 1 in accordance with a preferred embodiment of the present invention. FIG. 2 is an elevational view of the same. The clutch disk assembly 1 is a power transmission device used in the clutch device of a vehicle and has a clutch function and a damper function. The clutch function connects and disconnects torque by engaging and disengaging the flywheel (not shown) connected to an engine (not shown). The damper function absorbs and damps torque fluctuations that are received from the flywheel side using springs and the like.

Line O—O in FIG. 1 represents a rotational axis, i.e., rotational centerline, of the clutch disk assembly 1. The engine and the flywheel (not shown) are disposed to the left in FIG. 1, and the transmission (not shown) is disposed to the right of FIG. 1. In FIG. 2, the R1 direction is the rotational drive direction or positive direction of the clutch disk assembly 1, and the R2 direction is the opposite direction or negative direction. The specific angular values indicated in the following explanation are for illustrative purposes to facilitate understanding of the relationships between the various angles. The present invention is not limited to these values.

Figure 10:
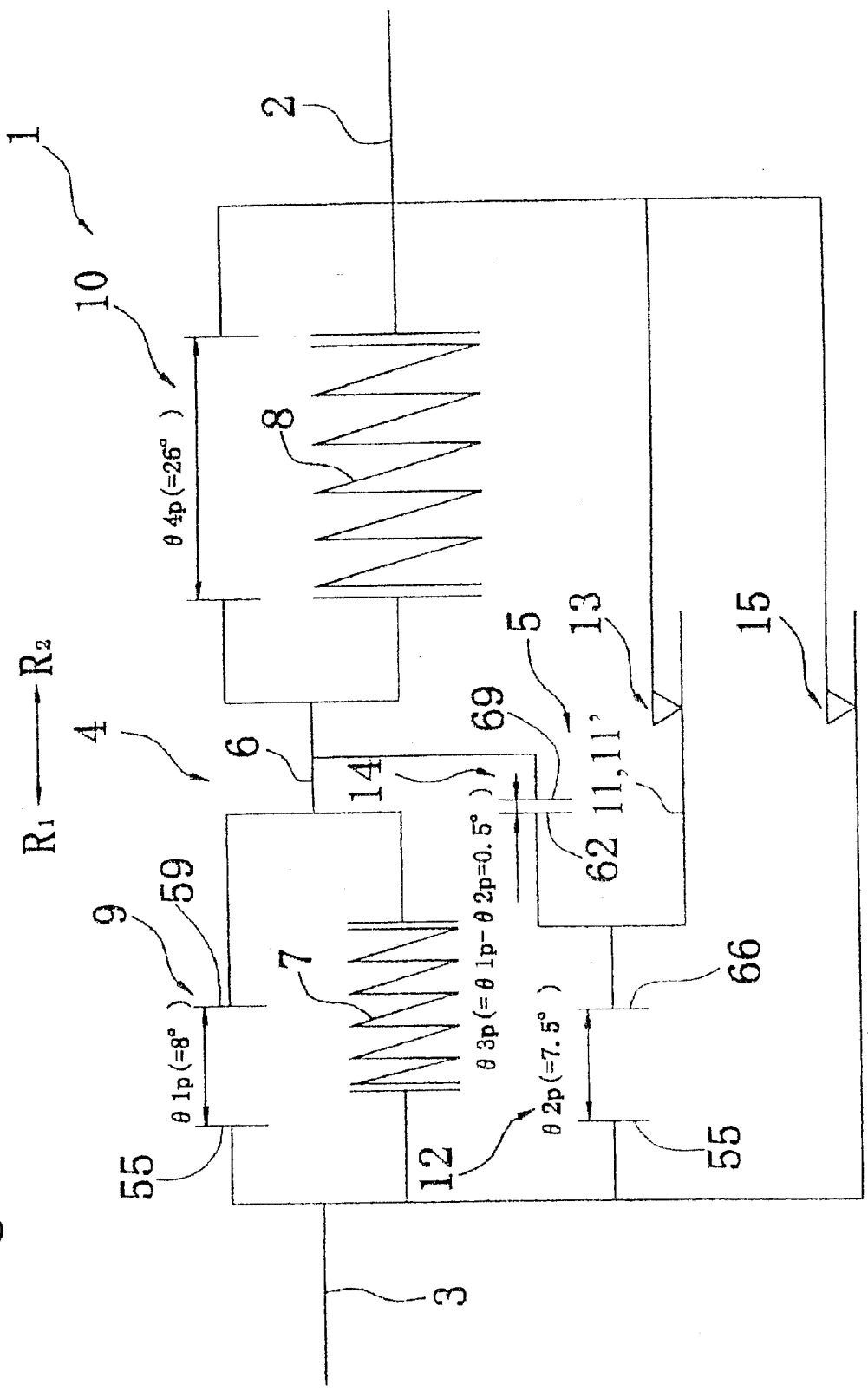
FIG. 10 is a mechanical circuit diagrammatical view of the damper mechanism of the clutch disk assembly.

Referring to FIGS. 1 and 2, the clutch disk assembly 1 has an input rotary member 2, a spline hub 3 serving as an output rotary member, and a damper section 4, which is indicated in FIG. 10. As shown in FIG. 10, the damper section 4 is disposed between the input rotary member 2 and the spline hub 3. The damper section 4 includes first springs 7, second springs 8, and a large friction mechanism 13.

Referring again to FIGS. 1 and 2, torque is delivered from the engine flywheel (not shown) to the input rotary member 2. The input rotary member 2 has a clutch plate 21, a retaining plate 22, and a clutch disk 23. The clutch plate 21 and the retaining plate 22 are both made preferably of sheet metal having the shape of an annular disk. The clutch plate 21 and the retaining plate 22 are disposed relative to each other with a prescribed spacing in the axial direction therebetween. The clutch plate 21 is disposed on the engine side and the retaining plate 22 is disposed on the transmission side of the clutch disk assembly 1. The clutch plate 21 and the retaining plate 22 are fixed together by plate-like coupling parts 31 which are discussed later. Therefore, the plate-like coupling parts 31 determine the axial spacing between the two plates 21 and 22 and cause them to rotate as a single unit.

The clutch disk 23 is configured to press against the flywheel (not shown). The clutch disk 23 has a cushioning plate 24 and first and second friction facings 25. The cushioning plate 24 has an annular part 24a, a plurality of cushioning parts 24b, and a plurality of coupling parts 24c. The plurality of cushioning parts 24b is arranged annularly around an outer perimeter of the annular part 24a. The plurality of coupling parts 24c extends radially inward from the annular part 24a. The coupling parts 24c are provided in four locations and each is fastened to the clutch plate 21 with rivets 27 which are discussed later. Friction facings 25 are fastened to both faces of each cushioning part 24b of the cushioning plate 24 using rivets 26. There are preferably four window holes 35 that are provided in the outer circumferential section of each of the clutch plate 21 and the retaining plate 22 with equal spacing in the circumferential direction. Cut-and-raised parts 35a and 35b are formed on a side farther from the rotational centerline and a side closer to the rotational centerline, respectively, of each window hole 35. These cut-and-raised parts 35a and 35b serve to restrict both axial and radial movement of the second springs 8 (discussed later). The cut-and-raised parts 35a are located radially outside of the cut-and-raised parts 35b. Abutment surfaces 36 that abut against or closely approach end parts of the second springs 8 are formed on both circumferentially facing ends of window holes 35.

Figure 3:
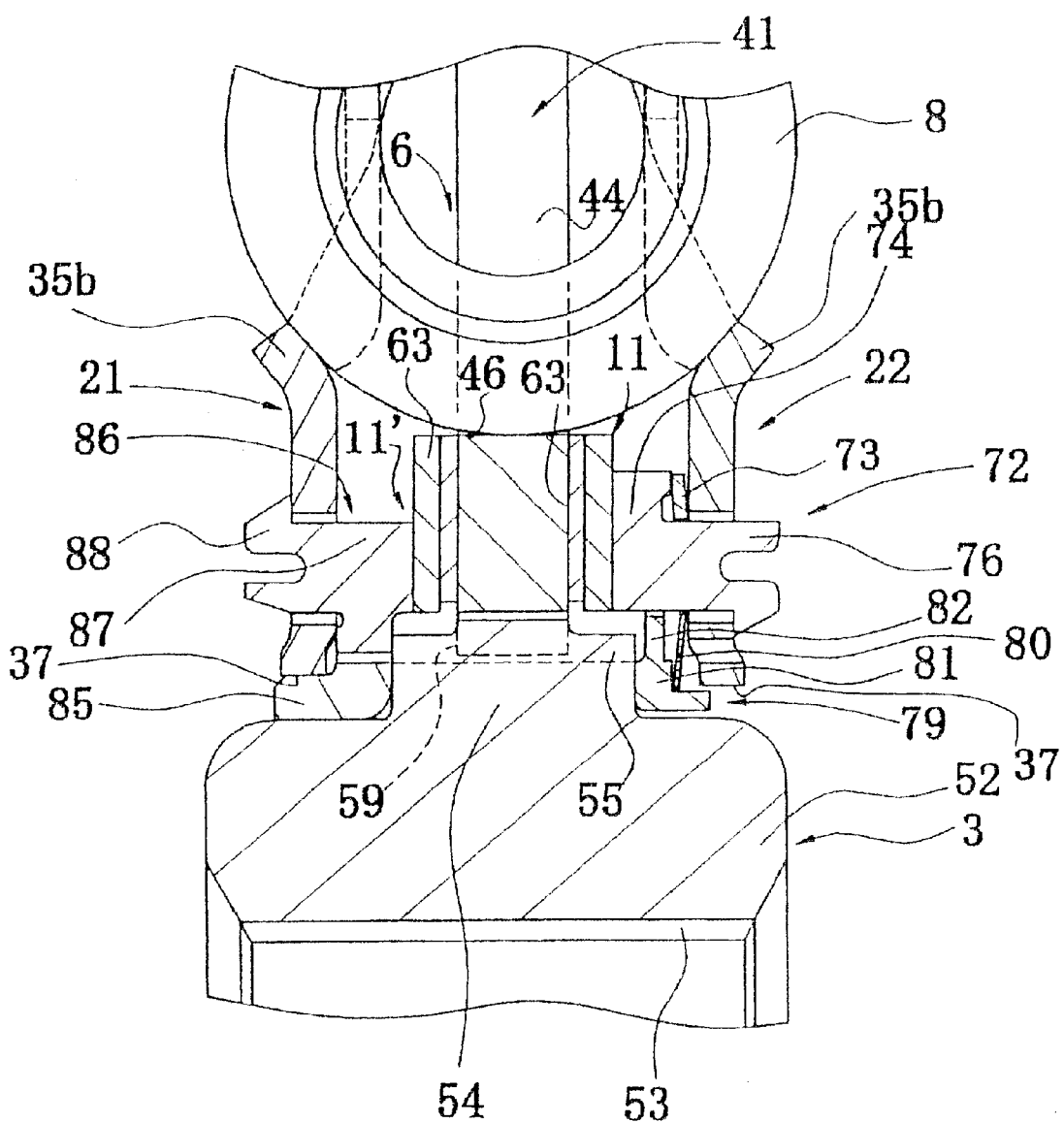
FIG. 3 is an enlarged partial view of a damper mechanism of the clutch disk assembly of FIG. 1.
Figure 5:
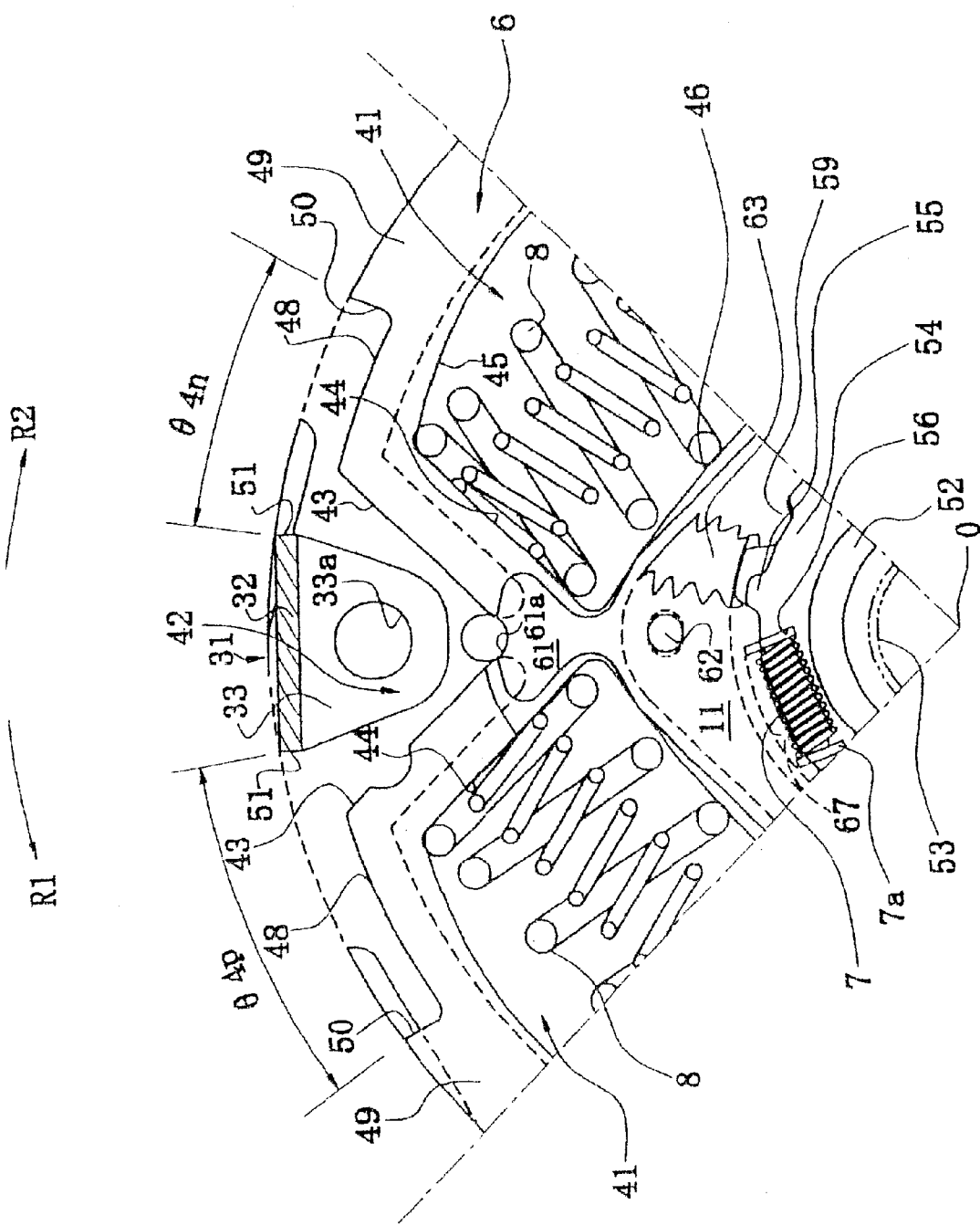
FIG. 5 is an elevational view illustrating twisting angles of components of the damper mechanism.

As seen in FIG. 3, a center hole 37 or internal edge is formed both on the clutch plate 21 and the retaining plate 22. The spline hub 3 that serves as the output rotary member is disposed inside the center hole 37. The spline hub 3 has a cylindrical boss 52 and a flange 54. The cylindrical boss 52 extends in the axial direction, and the flange 54 extends in the radial direction. An internal section of the boss 52 forms a spline hole 53 that meshes with a shaft (not shown) that extends from the transmission side. Referring to FIG. 5, the flange 54 is provided with a plurality of external teeth 55 and notches 56. The external teeth 55 are arranged in the rotational direction. The notches 56 are configured to house the first springs 7 (discussed later). The notches 56 are preferably formed in two locations that are opposite each other in the radial direction.

Figure 4:
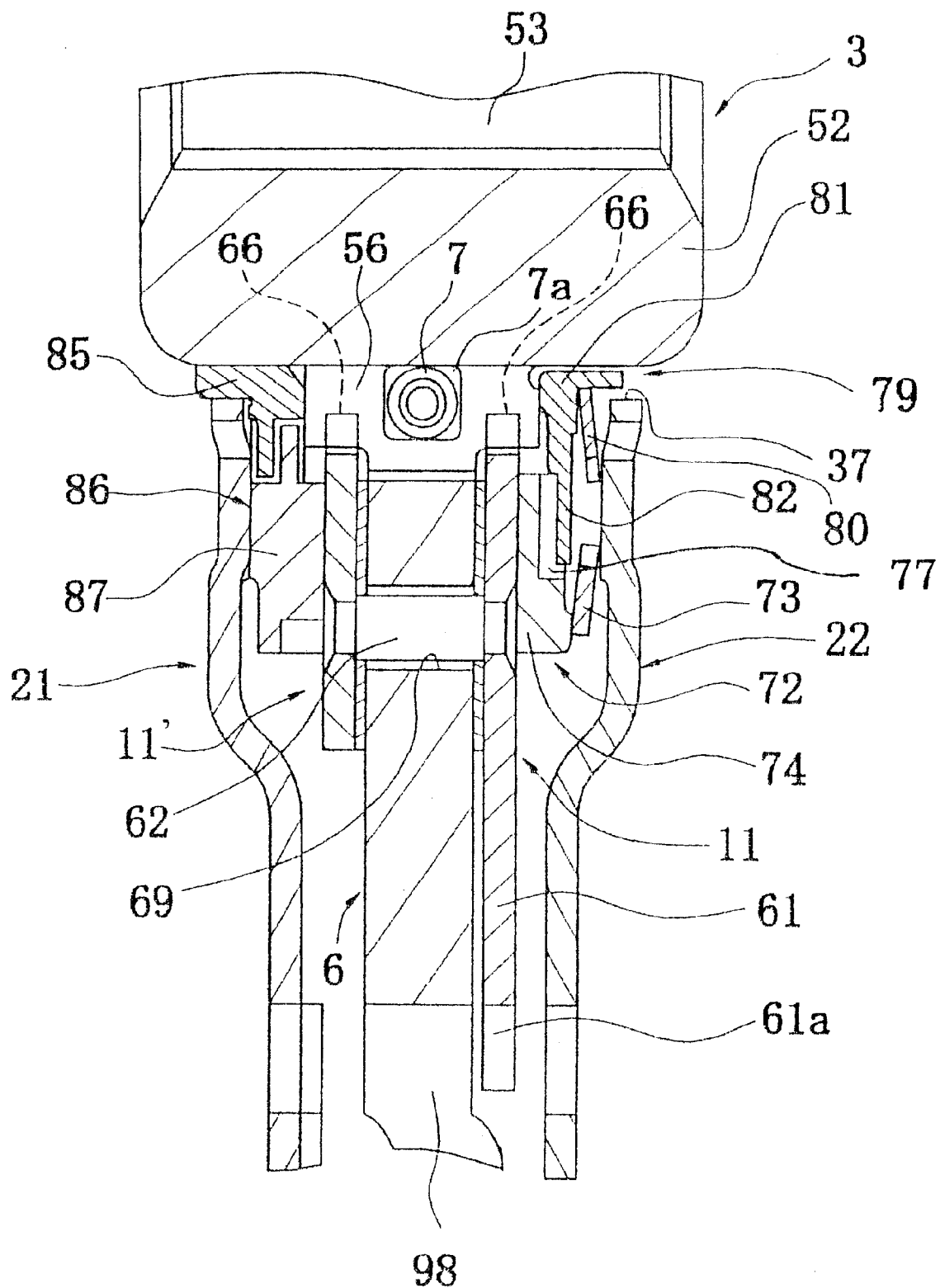
FIG. 4 is an alternate enlarged partial view of the damper mechanism.
Figure 15:
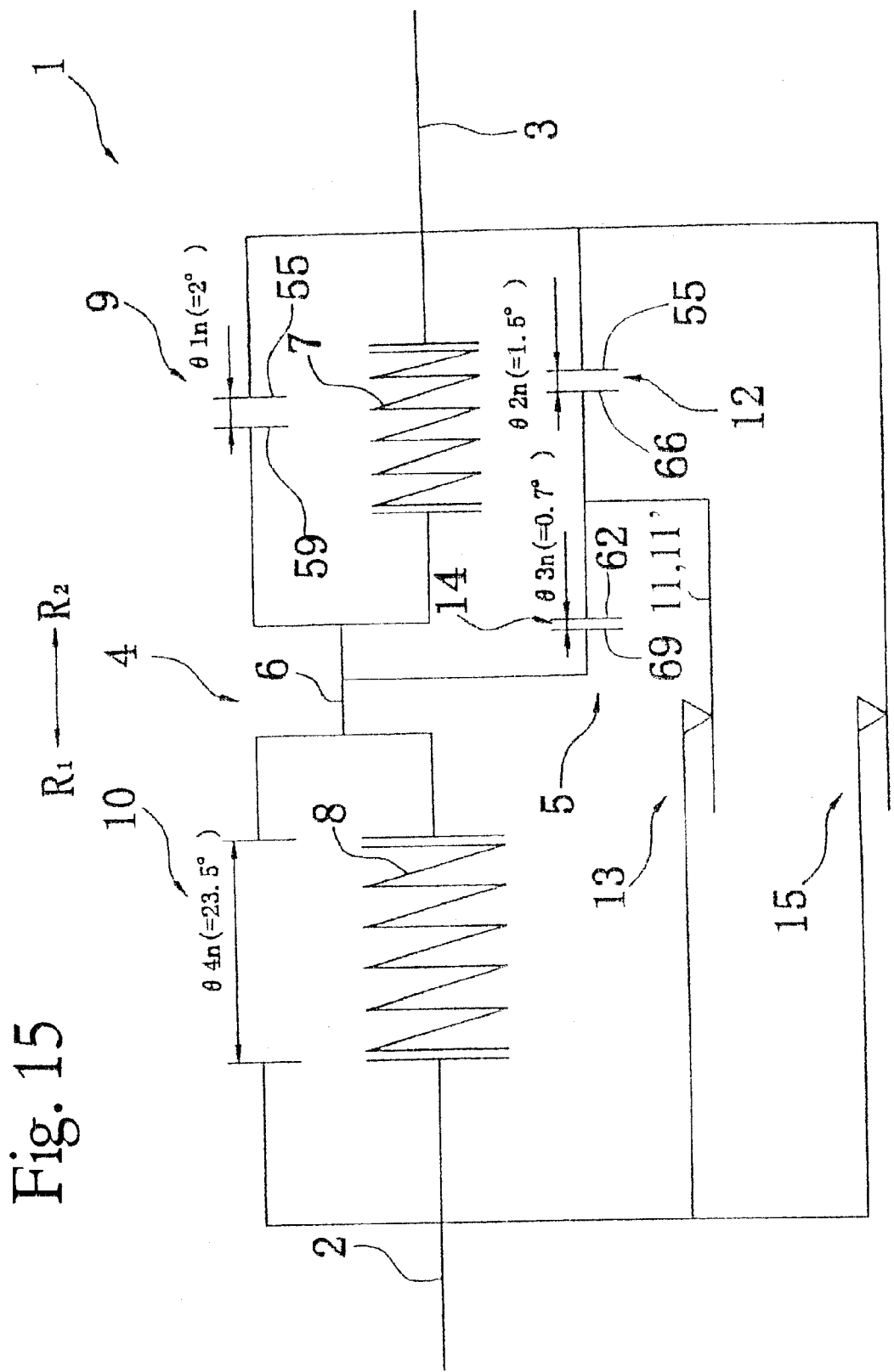
FIG. 15 is a mechanical circuit diagrammatical view of the damper mechanism of the clutch disk assembly.

Referring to FIGS. 3 and 4, a hub flange 6 is disposed to the outside of the spline hub 3 and between the clutch plate 21 and the retaining plate 22. The hub flange 6 is a disk-shaped member. The hub flange 6 is elastically connected to the spline hub 3 in the rotational direction via the first springs 7 and elastically connected to the input rotary member 2 via the second springs 8. As shown in detail in FIGS. 7 to 9, a plurality of internal teeth 59 is formed on the internal edge of the hub flange 6. The internal teeth 59 are disposed between the aforementioned external teeth 55 and are arranged with a prescribed spacing in the rotational direction. The external teeth 55 and the internal teeth 59 can touch against one another in the rotational direction. In short, referring to FIG. 10, the external teeth 55 and the internal teeth 59 form a first stopper 9 that serves to restrict the twisting angle between the spline hub 3 and the hub flange 6. The first stopper 9 mentioned here allows relative rotation to occur between the input rotary member 2 and the spline hub 3 to a prescribed angle but prevents relative rotation beyond the prescribed angle when the teeth 55 and 59 touch against each other. A first gap angle θ1 is secured between each external tooth 55 and each of the two internal teeth 59 located on both sides thereof in the rotational direction. More specifically, as seen in FIGS. 10 and 15, a first gap angle θ1p of 8 degrees is formed between each external tooth 55 and internal tooth 59 on the R2 side thereof. Further, a first gap angle θ1n of 2 degrees is formed between each external tooth 55 and internal tooth 59 on the R1 side thereof. Thus, the size of the first gap angle θ1p differs from the size of the first gap angle θ1n. The first gap angle θ1p is preferably larger than the first gap angle θ1n.

Furthermore, as seen in FIG. 5, notches 67 are formed on an internal edge of the hub flange 6 to correspond to the notches 56 of the flange 54. One first spring 7 is disposed inside each of the notches 56 and 67 to make preferably a total of two first springs. The first springs 7 are relatively low-rigidity coil springs. The first springs 7 are arranged to act in parallel. Circumferentially facing ends of the first springs 7 engage with the circumferentially facing ends of the notches 56 and 67 via spring seats 7a. Due to the structure described here, the spline hub 3 and the hub flange 6 compress the first springs 7 in the rotational direction within the range of the first gap angles θ1 when they rotate relative to each other.

Figure 6:
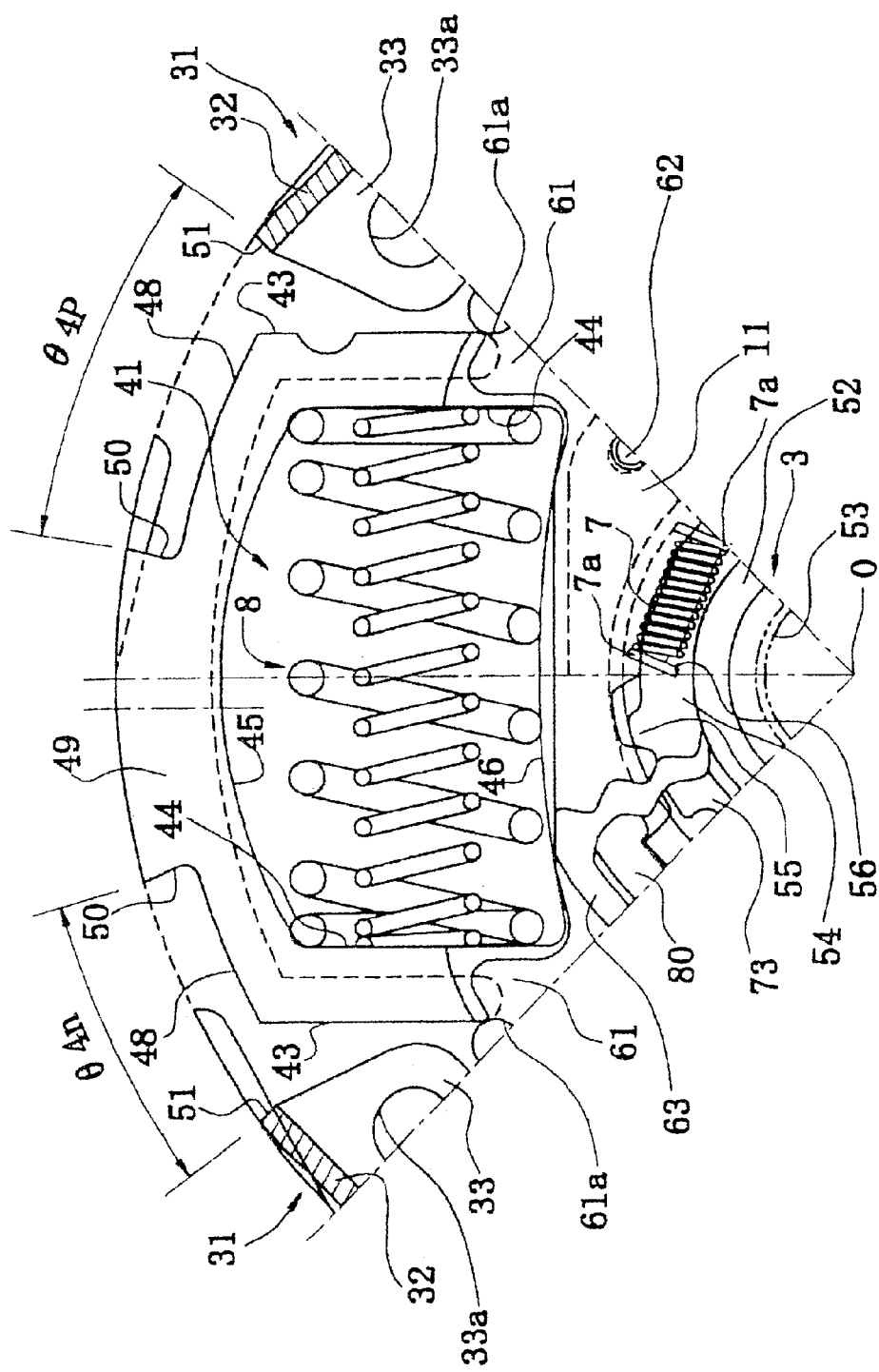
FIG. 6 is an alternate elevational view illustrating twisting angles of the components.

There are preferably four window holes 41 that are formed in the hub flange 6 with equal spacing in the rotational direction. The window holes 41 are shaped to extend lengthwise in the rotational direction. As shown in FIGS. 5 and 6, edges of each window hole 41 have abutment parts 44, an outside part 45, and an inside part 46. The abutment parts 44 are located on both circumferentially facing ends of each window hole 41. The outside part 45 is located farther outward in radial direction than the abutment parts 44. The inside part 46 is located on an inward radial side of each window hole 41. The outside part 45 is continuous and closes a radially outside section of the window hole 41 by connecting the abutment parts 44. It is also acceptable, however, for a portion of the outside section of the window hole 41 to be shaped to open outwardly in the radial direction. The inside part 46 connects a radially inside section of the window hole 41. A notch 42 is formed in the hub flange 6 circumferentially between each of the window holes 41. The notches 42 are fan-shaped and oriented such that their length in the circumferential direction increases outwardly in the radial direction. The notches also have edge faces 43 on both circumferentially facing sides.

A projection 49 is formed on the radially facing outside portion of each section where a window hole 41 is formed. In other words, the projections 49 extend outward in the radial direction from the outside edge 48 of the hub flange 6. The projections 49 extend lengthwise in the rotational direction and form stopper faces 50.

The second springs 8 are elastic members, i.e., springs, that are used in the damper mechanism of the clutch disk assembly 1. Each second spring 8 preferably has one pair of concentrically arranged coil springs. The second springs 8 are larger than the first springs 7 and also have a larger spring constant. The second springs 8 are housed inside the window holes 41 and 35. The second springs 8 are long in the rotational direction and preferably occupy the entirety of the window holes 41. The circumferentially facing ends of the second springs 8 touch or closely approach abutment parts 44 of the window holes 41 and abutment surfaces 36. Referring to FIG. 1, torque from the plates 21 and 22 can be transmitted to the hub flange 6 through the second springs 8. When the plates 21 and 22 rotate with respect to the hub flange 6, the second springs 8 are compressed therebetween. More specifically, as seen in FIGS. 1 and 6, each of the second springs 8 is compressed in the rotational direction between abutment surface 36 at one end and the abutment part 44 at the opposite end. When this occurs, the four second springs 8 preferably act in parallel.

Referring to FIGS. 2 and 5, the plate-like coupling parts 31 are preferably provided in four locations around the outside edge of the retaining plate 22. The plate-like coupling parts 31 are preferably spaced equally in the rotational direction. The plate-like coupling parts 31 connect the clutch plate 21 and the retaining plate 22 together and also form a portion of the stopper of the clutch disk assembly 1 (as discussed later). As seen best in FIG. 1, the plate-like coupling parts 31 are plate-like members formed integrally on the retaining plate 22 and have a prescribed width in the rotational direction. Referring again to FIGS. 2 and 5, the plate-like coupling parts 31 are disposed circumferentially between the window holes 41, i.e., in positions corresponding to the notches 42. Each of the plate-like coupling parts 31 has a stopper part 32 and a fastening part 33. As seen in FIG. 1, the stopper part 32 extends in the axial direction from an outside edge of the retaining plate 22. The fastening part 33 extends in a radially inward direction from the stopper part 32. The stopper parts 32 extend from the outside edge of the retaining plate 22 toward the clutch plate 21. The fastening parts 33 are bent radially inward from the end portion of the stopper parts 32. As seen in FIG. 5, each stopper part 32 has stopper faces 51 on both circumferentially facing sides thereof. The radial position of the fastening parts 33 corresponds to the outside portion of the window holes 41. The circumferential position of the fastening parts 33 is between and next to the window holes 41 in the rotational direction. As a result, the fastening parts 33 are disposed so as to correspond to the notches 42 of the hub flange 6. The notches 42 are larger than the fastening parts 33 and, consequently, during assembly the fastening parts 33 can move through the notches 42 when the retaining plate 22 is moved in the axial direction with respect to the clutch plate 21. As seen in FIG. 1, the fastening parts 33 are parallel to and abut the coupling parts 24c of the cushioning plate 24 from the transmission side. Referring to FIG. 5, a hole 33a is formed in each fastening part 33. As shown in FIG. 1, one of the previously mentioned rivets 27 is inserted through each hole 33a. The rivets 27 connect the fastening parts 33, the clutch plate 21, and the cushioning plate 24 together as a single unit. Setting holes 34 for setting the rivets are provided in the retaining plate 22 at positions corresponding to the fastening parts 33.

Next, referring to FIGS. 5 and 10, a second stopper 10, which has the stopper parts 32 of the plate-like coupling parts 31 and the projections 49, is discussed. The second stopper 10 is a mechanism that allows the hub flange 6 and the input rotary member 2 to undergo relative rotation up to a gap angle of θ4 but prevents relative rotation of the two members beyond the gap angle when the twisting angle reaches θ4. When relative rotation occurs within the range of the gap angle θ4, the second springs 8 are compressed between the hub flange 6 and the input rotary member 2. More specifically, a fourth gap angle θ4p of 26 degrees is formed between each projection 49 and stopper part 32 on the R2 side of the projection 49. Further, a fourth gap angle θ4n of 23.5 degrees is formed between each projection 49 and the stopper part 32 on the R1 side of the projection 49. Thus, the size of fourth gap angle θ4p differs from the size of fourth gap angle θ4n in that the fourth gap angle θ4p is larger than the fourth gap angle θ4n. In order to achieve the preferred relationship between the fourth gap angles θ4p and θ4n, the projections 49 are offset in the circumferential direction with respect to the center position between the stopper parts 32, as best seen in FIG. 6.

Referring to FIGS. 3 and 4, friction plates 11 and 11' are a pair of plate members arranged externally of the spline hub 3. One friction plate 11' is arranged between the clutch plate 21 and the hub flange 6. Another friction plate 11 is arranged between the hub flange 6 and the retaining plate 22. The friction plates 11 and 11' are shaped like an annular disk and form a portion of the damper section 4 between the input rotary member 2 and the spline hub 3. A plurality of internal teeth 66 is formed on the internal edges of the friction plates 11 and 11'. As shown in detail in FIG. 7, the internal teeth 66 are disposed so as to overlap with the internal teeth 59 of the hub flange 6 in the axial direction. The internal teeth 66 are wider in the circumferential direction than the internal teeth 59. Both ends of the internal teeth 66 protrude beyond the ends of the internal teeth 59 in the circumferential direction. The internal teeth 66 are disposed so as to have a prescribed gap with respect to the external teeth 55 of the spline hub 3 in the rotational direction. In other words, the spline hub 3 and the friction plates 11 can undergo relative rotation within the range of this gap. As seen in FIG. 10, the external teeth 55 and the internal teeth 66 form a third stopper 12 that restricts the relative rotation angle between the spline hub 3 and the friction plates 11. Referring again to FIG. 7, the third stopper 12 made of the external teeth 55 and the internal teeth 66 secures a second gap angle θ2 between the external teeth 55 and the internal teeth 66. More specifically, a second gap angle θ2p of 7.5 degrees is formed between each external tooth 55 and each internal tooth 66 on the R2 side of each external tooth 55. Further, a second gap angle θ2n of 1.5 degrees is formed between each external tooth 55 and the internal tooth 66 on the R1 side of each external tooth. Thus, the second gap angle θ2p differs in size from and is preferably larger than the second gap angle θ2n. Meanwhile, the second gap angle θ2p is smaller than the first gap angle θ1p and the second gap angle θ2n is smaller than the first gap angle θ1n.

As seen in FIGS. 2 and 4, the friction plate 11, which is disposed closer to the retaining plate 22, has a plurality of protrusions 61 that extend outward in the radial direction. Referring to FIGS. 4 and 5, the protrusions 61 are arranged between the window holes 41 of the hub flange 6. A semicircular positioning notch 61a is formed at outer radial intersections of one edge face 43 of one of the window holes 41 with another edge face 43. As seen in FIGS. 4 and 5, the notches 61a correspond to positioning notches 98 formed in the hub flange 6 and the positioning holes formed in the plates 21 and 22.

Figure 7:
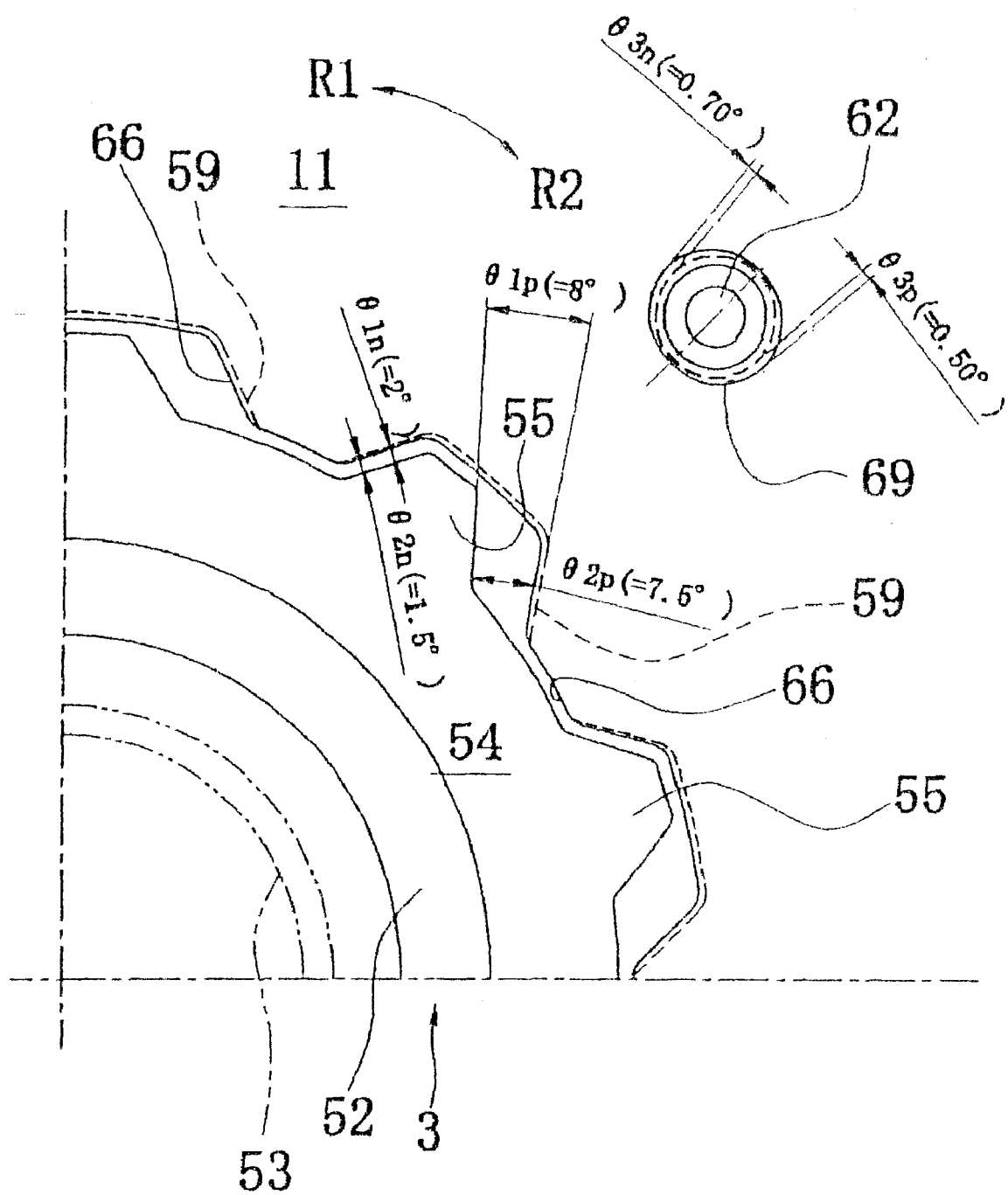
FIG. 7 is an enlarged partial elevational view illustrating twisting angles of the components.

A plurality of pins 62 serve to prevent the two friction plates 11 and 11' from rotating relative to each other. The pins 62 also establish the axial positioning of the two friction plates 11 and 11' with respect to each other. The pins 62 have a body section and head sections that extend from both ends of the body part in the axial direction. Each one of the friction plates 11 and 11' is prevented from approaching the other in the axial direction by their contact with the end faces of the body parts of the pins 62. The head sections of the pins 62 are inserted through holes formed in the friction plates 11 and 11'. The friction plates 11 and 11' sandwich the pins 62 between themselves and the body section. As seen in FIGS. 3 and 4, a spacer 63 is disposed between each friction plate 11 and 11' and the hub flange 6. The spacers 63 are annular plate members disposed between the inner circumferential section of the friction plates 11 and 11' and the annular inner portion of the hub flange 6. Holes for inserting the body sections of the pins 62 are provided in the spacers 63. The spacers 63 are made to rotate integrally with the fiction plates 11 and 11' by the engagement of the pins 62 with the holes. A coating for reducing the coefficient of friction is applied to the spacers 63 on the sides that touch the hub flange 6. As seen in FIGS. 4 and 7, a plurality of holes 69 through which the pins 62 pass is formed in the hub flange 6. The pins 62 can move relative to the holes 69 through a prescribed angle in both circumferential directions. That is, a third gap angle θ3 is secured on both sides of the body section of each pin 62 with respect to both circumferentially facing portions of the inside surface of each hole 69. As a result, as seen in FIG. 10, a fourth stopper 14 is formed. Referring to FIG. 7, a third gap angle θ3p is secured between each pin 62 and the portion of the inside surface of hole 69 on the R2 side thereof. Further, a third gap angle θ3n is secured between each pin 62 and the portion of the inside surface of hole 69 on the R1 side thereof. The sizes of the third gap angles θ3p and θ3n differ. The third gap angle θ3p is preferably 0.50 degree and the third gap angle θ3n is preferably 0.70 degree. The size of the third gap angle θ3p is preferably equal to the difference between the first gap angle θ1p and the second gap angle θ2p (θ3p=θ1p−θ2p). Additionally, the size of the third gap angle θ3n is preferably equal to the difference between the first gap angle θ1n and the second gap angle θ2n (θ3n=θ1n−θ2n).

The relative positioning of the pins 62 and the holes 69 described here places the pins 62 closer to the R2 side of the holes 69 when in the neutral condition shown in FIG. 7. More specifically, the circumferential position of the pins 62 is on the R2 side of the circumferential center position of holes 69. In other words, in the neutral condition shown in FIG. 7, the pins 62 are closer to an R2 side inner edge of the holes 69 than they are to an R1 side inner edge of the holes 69. This positioning is achieved by moving the position of the pins 62 or changing the size of holes 69 in the hub flange 6 on both circumferentially facing sides thereof.

Next, the members that constitute the friction generating mechanism are described. Referring to FIGS. 3 and 4, a second friction washer 72 is disposed between the inner circumferential portion of the friction plate 11, which is on the transmission side, and the inner circumferential portion of the retaining plate 22. The second friction washer 72 chiefly has a main body 74 made preferably of resin. The friction surface of the main body 74 touches the surface that faces the transmission of the transmission side friction plate 11. An engaging part 76 extends from an inner circumferential portion of the main body 74 toward the transmission. The engaging part 76 engages with the retaining plate 22 such that relative rotation cannot occur therebetween. The engaging part 76 also secures the retaining plate in the axial direction. A plurality of recessions 77 is formed on the transmission side of an inner circumferential portion of the main body 74. A second cone spring 73 is disposed between the main body 74 and the retaining plate 22. The second cone spring 73 is arranged to be compressed between the main body 74 of the second friction washer 72 and the retaining plate 22. As a result, the friction surface of the second friction washer 72 is pressed firmly against first friction plate 11. A first friction washer 79 is disposed between the flange 54 and an inner circumferential portion of the retaining plate 22. Thus, the first friction washer 79 is disposed radially inside of the second friction washer 72 and while being disposed radially outside of the boss 52. The first friction washer 79 is preferably made of resin. The first friction washer 79 chiefly has an annular main body 81. A plurality of projections 82 extends outward in a radial direction from the annular main body 81. The main body 81 touches the flange 54 and the plurality of projections 82 engages the recessions 77 of the second friction washer 72 such that relative rotation cannot occur therebetween. As a result, the first friction washer 79 can rotate integrally with the retaining plate 22 through its engagement with the second friction washer 72. A first cone spring 80 is disposed between the first friction washer 79 and an inner circumferential portion of the retaining plate 22. The first cone spring 80 is arranged such that it is compressed in an axial direction between the first friction washer 79 and the inner circumferential portion of the retaining plate 22. Furthermore, the force exerted by the first cone spring 80 is designed to be smaller than the force exerted by the second cone spring 73. The first friction washer 79 is made of a material having a lower coefficient of friction than the second friction washer 72. Consequently, the friction or hysteresis torque generated by the first friction washer 79 is much smaller than the friction generated by the second friction washer 72.

A third friction washer 85 and a fourth friction washer 86 are disposed between an inner circumferential portion of the clutch plate 21 and both the flange 54 and an inner circumferential portion of the friction plate 11'. The third friction washer 85 and the fourth friction washer 86 are annular members made preferably of resin. The third friction washer 85 engages an internal edge of the clutch plate 21 such that relative rotation cannot occur therebetween. The internal surface of the washer touches an external surface of the boss 52 such that it can slide thereon. Thus, the clutch plate 21 is positioned in the radial direction with respect to the boss 52 by means of the third friction washer 85. The third friction washer 85 touches the side of the flange 54 that faces the engine in the axial direction. The fourth friction washer 86 is disposed radially outside of the third friction washer 85. The fourth friction washer 86 has an annular main body 87 and a plurality of engaging parts 88. The plurality of engaging parts 88 extends from the annular main body 87 toward the engine in the axial direction. The main body 87 has a friction surface that touches the friction plate 11' that is closer to the engine in the axial direction. The engaging parts 88 engage with holes formed in the clutch plate 21 such that relative rotation cannot occur. The engaging parts 88 have claw parts that touch an axial surface of the clutch plate 21 on the side that faces toward the engine in the axial direction. The third friction washer 85 and the fourth friction washer 86 engage each other such that they cannot rotate relative to each other. The third friction washer 85 and the fourth friction washer 86 are separate members. The fourth friction washer 86 is made of a material having a higher friction coefficient than the material of the third friction washer 85.

In the previously discussed friction mechanism, the large friction mechanism 13 (friction mechanism) generates a relatively high hysteresis torque. The large friction mechanism 13 is formed between the friction plates 11 and 11' and the second friction washer 72 and the fourth friction washer 86, respectively. Meanwhile, as shown in FIG. 10, a small friction mechanism 15 generates a relatively low hysteresis torque. Referring again to FIGS. 3 and 4, the small friction mechanism 15 includes and is formed between the flange 54 and the first friction washer 79, and the flange 54 and the third friction washer 85.

Next, the constituent features of the clutch disk assembly 1 are further described with reference to FIG. 10. FIG. 10 is a mechanical circuit diagram illustrating the damper mechanism function of the clutch disk assembly 1. This mechanical circuit diagram illustrates in a schematic manner the relationships between the members of the damper mechanism in terms of the rotational direction. Consequently, members that rotate as a single unit are treated as one member.

As FIG. 10 clearly illustrates, a plurality of members is arranged between the input rotary member 2 and the spline hub 3 in order to construct the damper section 4. The hub flange 6 is disposed rotationally between the input rotary member 2 and the spline hub 3. The hub flange 6 is elastically coupled to the spline hub 3 in the rotational direction via the first springs 7. The first stopper 9 is also formed between the hub flange 6 and the spline hub 3. The first springs 7 can be compressed over the first gap angle $\theta 1p$ of the first stopper 9. The hub flange 6 is elastically coupled to the input rotary member 2 in the rotational direction via the second springs 8. Additionally, the second stopper 10 is formed between the hub flange 6 and the input rotary member 2. The second springs 8 can be compressed over the fourth gap angle $\theta 4p$ of the second stopper 10. As previously discussed, the input rotary member 2 and the spline hub 3 are coupled together elastically in the rotational direction by means of the first springs 7 and the second springs 8, which are arranged in series. Thus, the hub flange 6 functions as an intermediate member disposed between two different types of springs. This structure can be viewed as a structure in which a first damper having the first springs 7, which are arranged in parallel with each other, and the first stopper 9 is arranged in series with a second damper having the second springs 8, which are arranged in parallel with each other, and the second stopper 10. Additionally, the structure can also be viewed as having the damper section 4 that elastically couples the input rotary member 2 and the spline hub 3 together rotationally. The total rigidity of the first springs 7 is set to be far less than the total rigidity of the second springs 8. Consequently, the second springs 8 are hardly compressed in the rotational direction in the range of twisting angles up to the first gap angle $\theta 1$.

The friction plates 11 and 11' are rotationally disposed between the input rotary member 2 and the spline hub 3. The friction plates 11 and 11' are arranged such that they can undergo relative rotation between the spline hub 3 and the hub flange 6. The third stopper 12 is formed between the friction plates 11 and 11' and the spline hub 3. Further, the fourth stopper 14 is formed between the friction plates 11 and 11' and the hub flange 6. Moreover, the friction plates 11 and 11' are frictionally engaged with the input rotary member 2 in the rotational direction by means of the large friction mechanism 13. Thus arranged between the input rotary member 2, the spline hub 3, and the hub flange 6, the friction plates 11 form the frictional coupling mechanism 5.

Next, the relationships among the gap angles $\theta 1$ to $\theta 4$ of the damper mechanism shown in FIG. 10 are described. The gap angles are described here as viewed from the spline hub 3 toward the input rotary member 2 in the R2 direction. The first gap angle $\theta 1p$ of the first stopper 9 is the angular range over which the first springs 7 are compressed in the rotational direction, and the fourth gap angle $\theta 4p$ of the second stopper 10 is the angular range over which the second springs 8 are compressed in the rotational direction. The sum of the first gap angle $\theta 1p$ and the fourth gap angle $\theta 4p$ is the maximum twisting angle of the entire clutch disk assembly 1 when it functions as a damper mechanism in the positive direction. The third gap angle $\theta 3p$ is preferably equal to the difference between the first gap angle $\theta 1p$ and the second gap angle $\theta 2p$. Therefore, there is no positive-side second stage gap angle in the second stage of the positive side for preventing the large friction mechanism 13 from operating when minute torsional vibrations are inputted.

Figure 18:
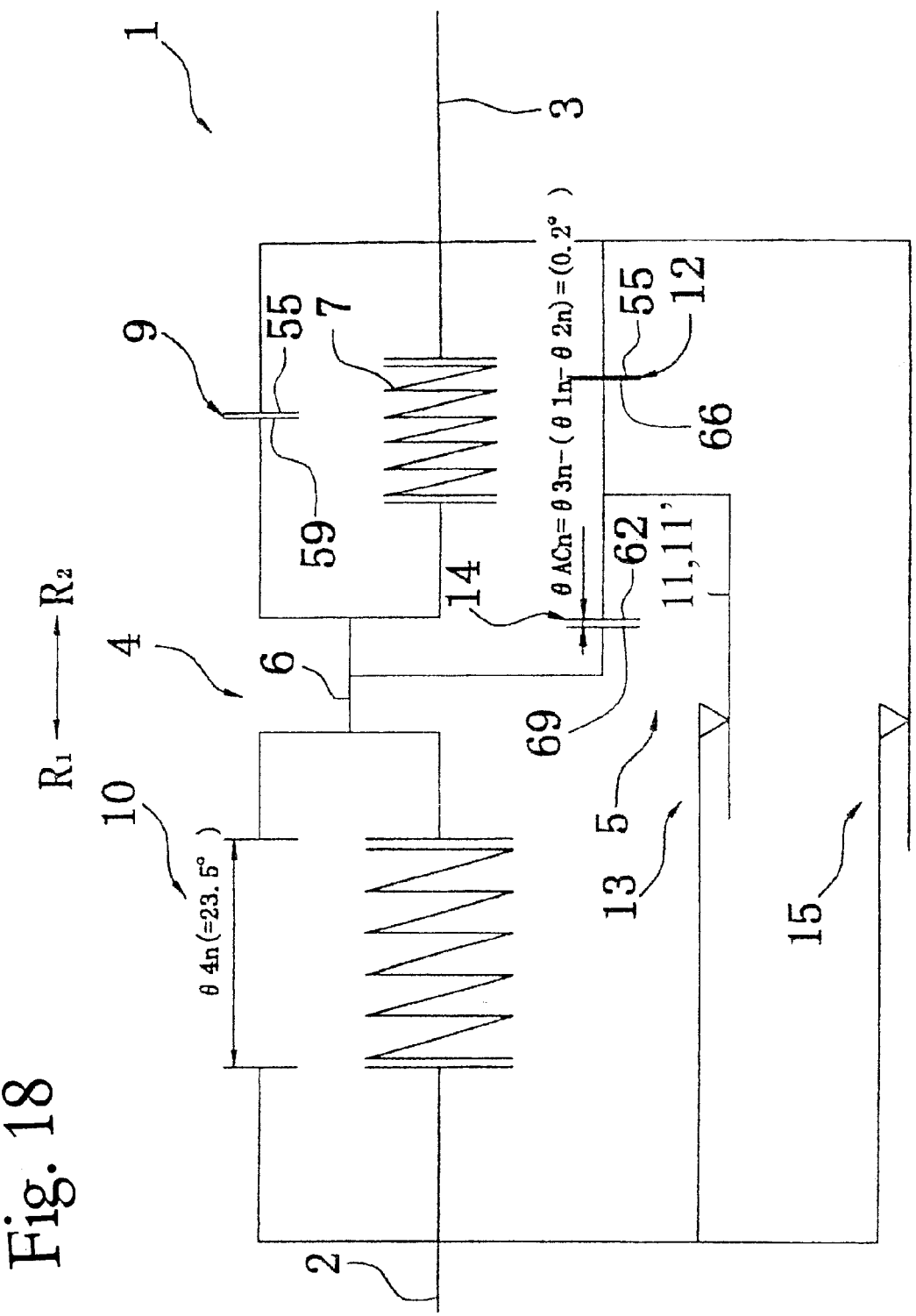
FIG. 18 is a mechanical circuit diagrammatical view of the damper mechanism of the clutch disk assembly.
Figure 19:
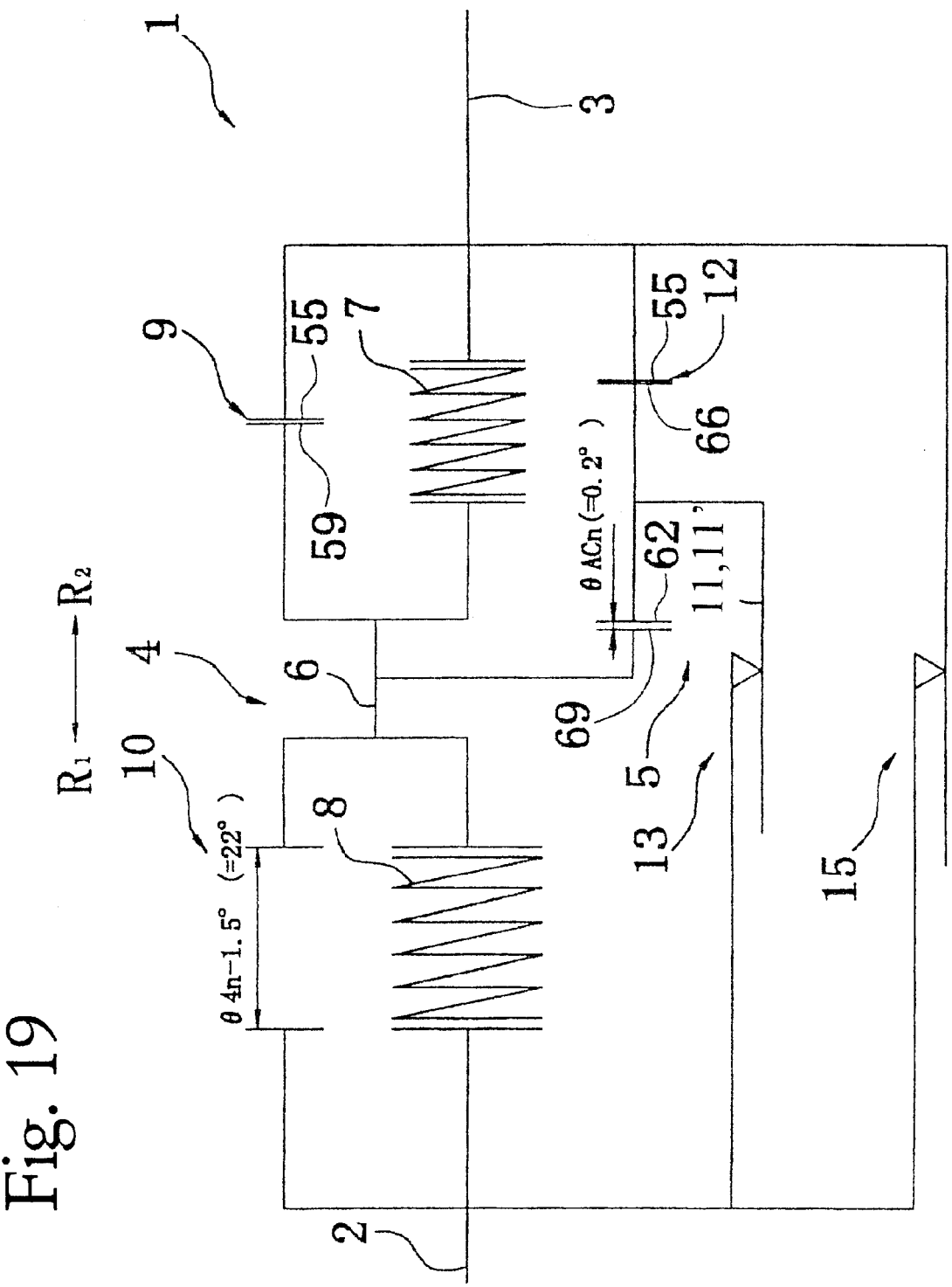
FIG. 19 is a mechanical circuit diagrammatical view of the damper mechanism of the clutch disk assembly.

Next, the relationships among gap angles $\theta 1n$ to $\theta 4n$ of the damper mechanism shown in FIG. 15 are described. The gap angles are described here as viewed from the spline hub 3 toward the input rotary member 2 in the R1 direction. The first gap angle $\theta 1n$ of the first stopper 9 is the angular range over which the first springs 7 are compressed in the rotational direction, and the fourth gap angle $\theta 4n$ of the second stopper 10 is the angular range over which the second springs 8 are compressed in the rotational direction. The sum of the first gap angle $\theta 1n$ and fourth gap angle $\theta 4n$ is the maximum twisting angle of the entire clutch disk assembly 1 when it functions as a damper mechanism in the negative direction. The value obtained when the difference between the first gap angle $\theta 1n$ and the second gap angle $\theta 2n$ is subtracted from the third gap angle $\theta 3n$ is the magnitude of negative-side second stage gap angle $\theta ACn$ as seen in FIG. 18. The negative-side second stage gap angle $\theta ACn$ prevents the large friction mechanism 13 from operating when minute torsional vibrations are inputted while the damper mechanism is operating in the second stage on the negative side of the torsion characteristic. The magnitude of the negative-side second stage gap angle $\theta ACn$ in this embodiment is 0.2 degree, which is much smaller than in the prior art; an angle of 0.15 to 0.25 degree is preferred. The negative-side second stage gap angle $\theta ACn$ can be held to a high degree of precision because it is formed between the pins 62, which serve as fastening members that extend in the axial direction, and holes 69 in the hub flange 6. As a result, small angles of less than 1 degree can be achieved. It is also acceptable for the holes 69 to have a shape in which a portion has been notched.

The present invention can also be used in a structure in which negative-side second stage gap angle $\theta ACn$ is provided between friction plate 11 and the second springs 8. As shown in FIG. 15, the small friction mechanism 15 is provided between the input rotary member 2 and the spline hub 3. The small friction mechanism 15 is constituted such that sliding always occurs when the input rotary member 2 and the spline hub 3 rotate relative to each other. In this embodiment, the small friction mechanism 15 chiefly has the first friction washer 79 and the third friction washer 85 but it is also acceptable to use other members. Also, depending on the situation, it is preferred that the hysteresis torque generated by the small friction mechanism 15 be as small as possible.

Next, the operation of the damper mechanism of the clutch disk assembly 1 is explained in detail using a plurality of mechanical circuit diagrams. FIGS. 10 to 14 are used to explain the operation of and relationships between the members when the spline hub 3 is twisted in the R2 direction with respect to the input rotary member 2 such that the damper mechanism is operating on the positive side (right side in FIG. 20) of the torsion characteristic. FIGS. 15 to 19 are used to explain the operation of and relationships between the members when the output rotary member is twisted in the R1 direction with respect to the input rotary member 2 such that the damper mechanism is operating on the negative side (left side in FIG. 20) of the torsion characteristic.

Figure 11:
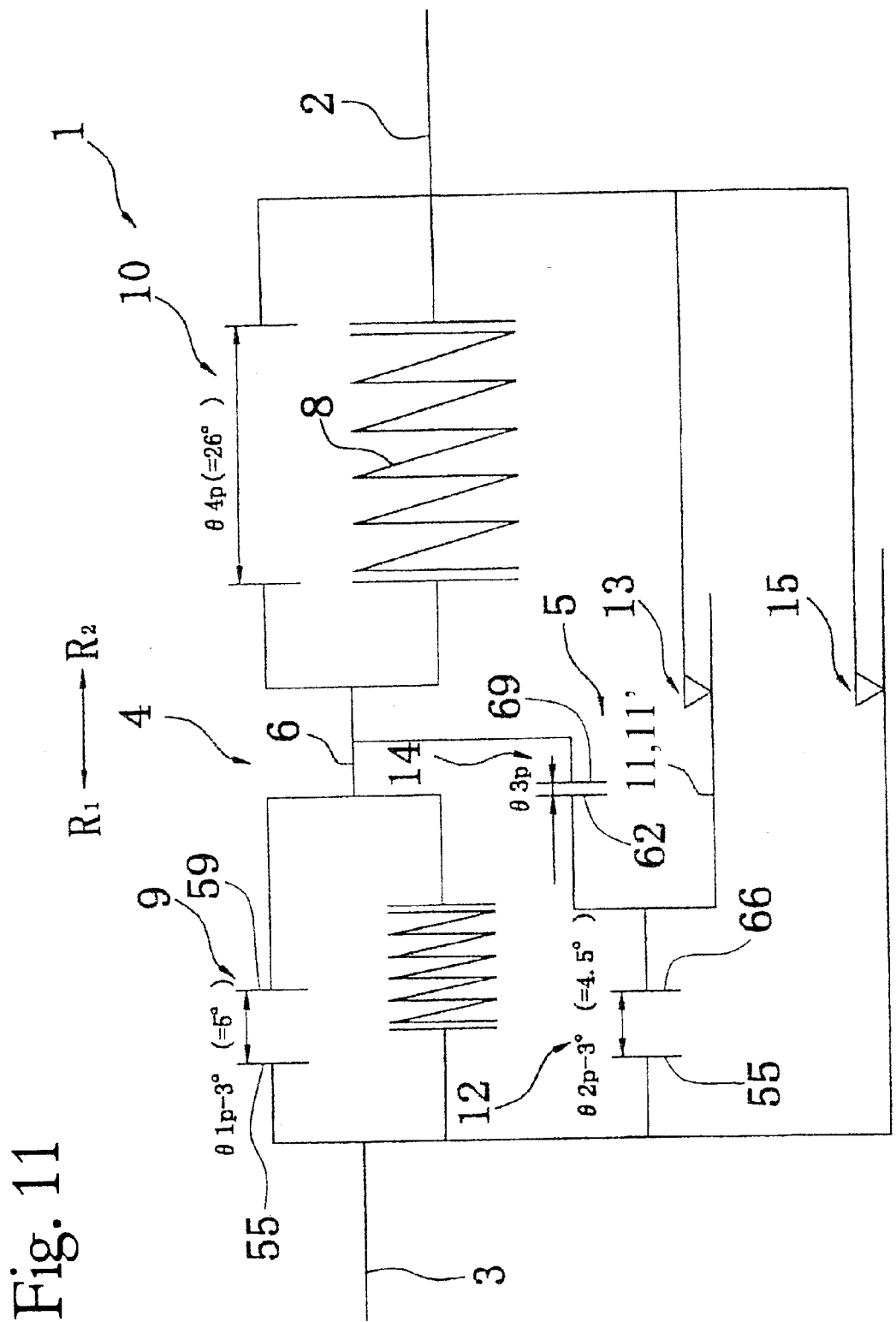
FIG. 11 is a mechanical circuit diagrammatical view of the damper mechanism of the clutch disk assembly.

Referring to FIG. 10, when the spline hub 3 is twisted in the R2 direction with respect to the input rotary member 2 from the neutral condition shown in FIG. 10, the input rotary member 2 is twisted in the R1 direction, i.e., the rotational drive direction, with respect to the spline hub 3. FIG. 11 shows the condition obtained when the spline hub 3 is rotated 3 degrees with respect to the input rotary member 2 in the R2 direction from the condition shown in FIG. 10.

Figure 8:
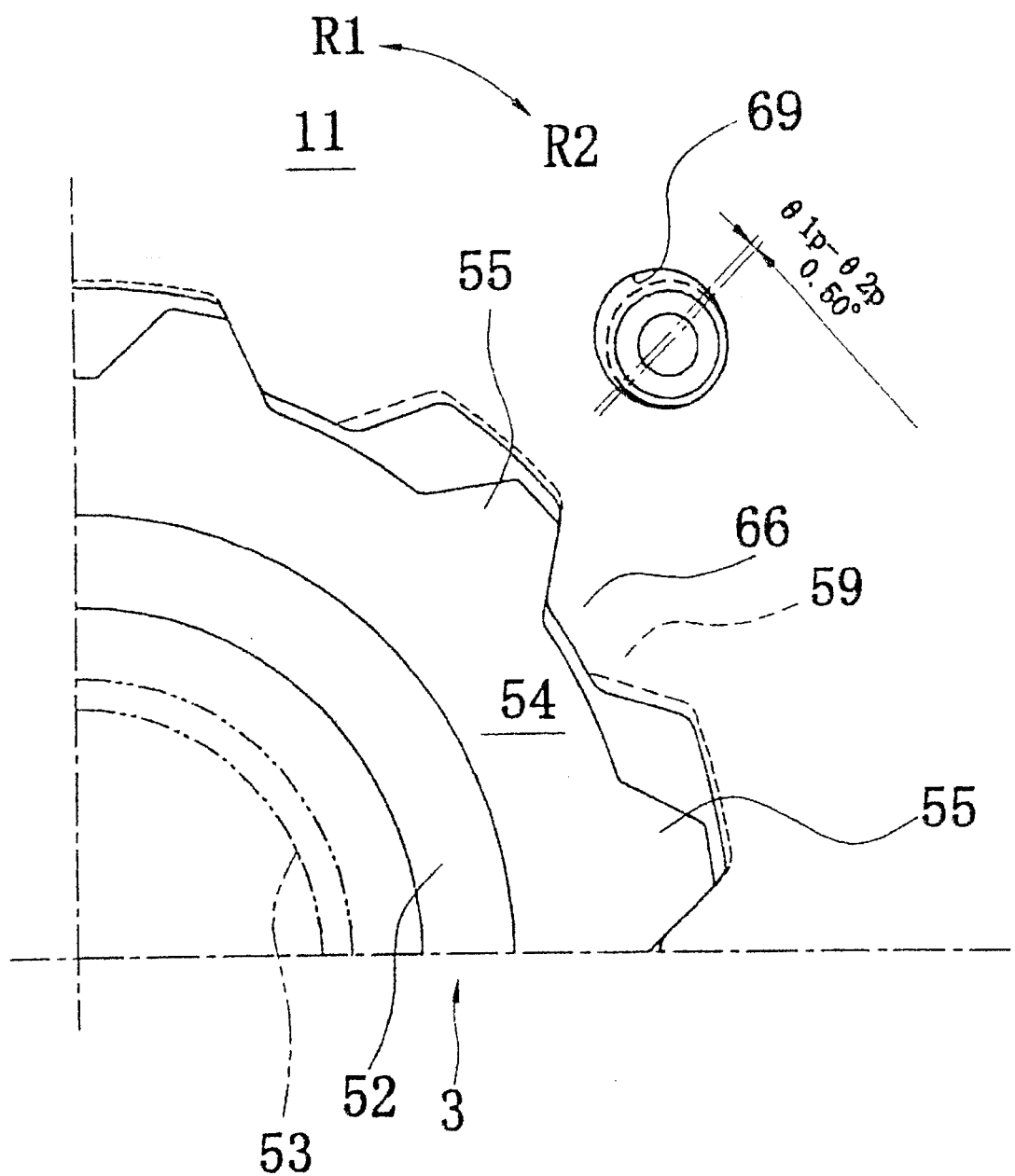
FIG. 8 is an alternate enlarged partial elevational view illustrating twisting angles of the components.
Figure 12:
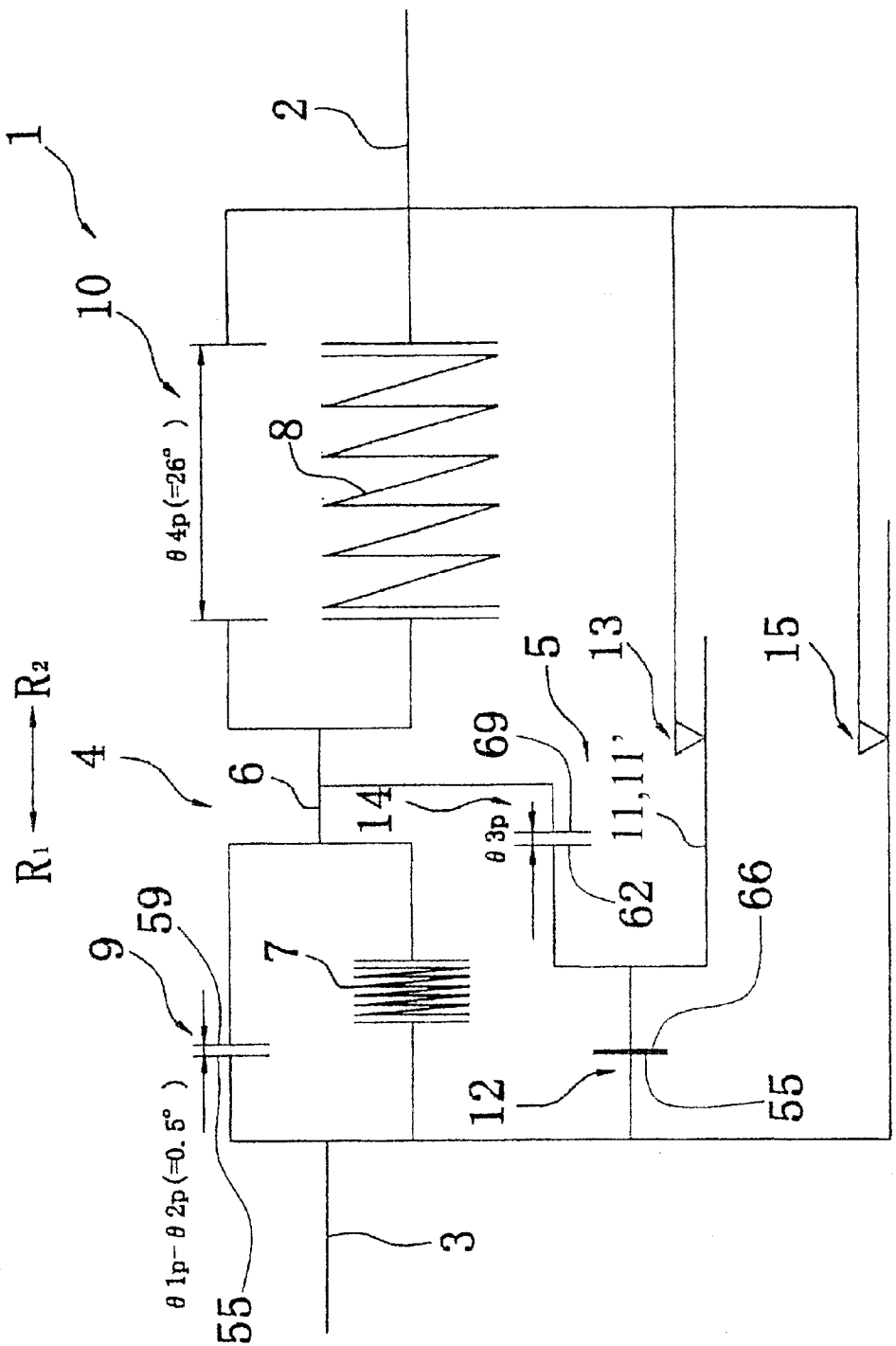
FIG. 12 is a mechanical circuit diagrammatical view of the damper mechanism of the clutch disk assembly.
Figure 13:
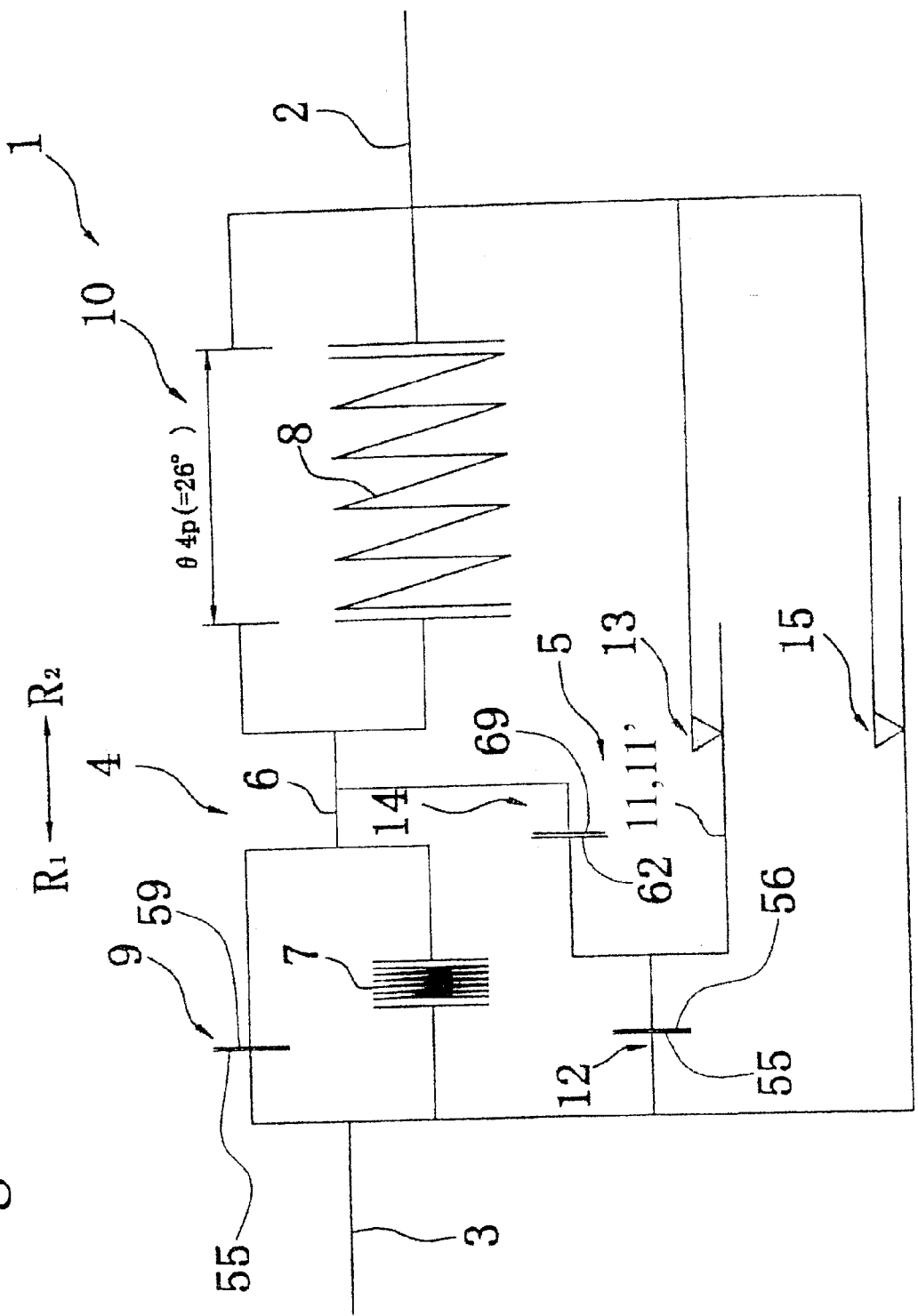
FIG. 13 is a mechanical circuit diagrammatical view of the damper mechanism of the clutch disk assembly.
Figure 14:
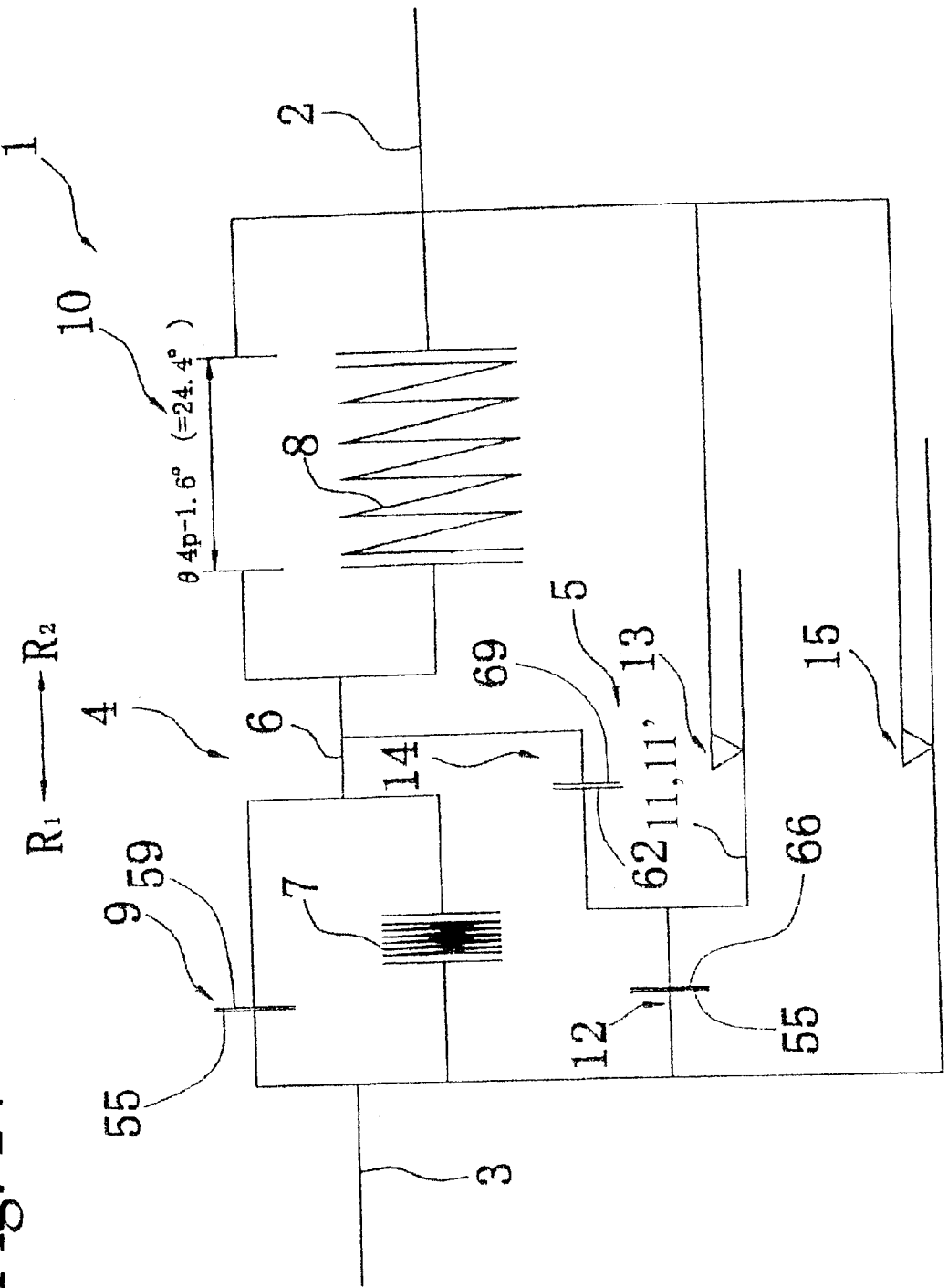
FIG. 14 is a mechanical circuit diagrammatical view of the damper mechanism of the clutch disk assembly.

During this shift, the first springs 7 are compressed in the rotational direction between the spline hub 3 and the hub flange 6 and sliding occurs in the small friction mechanism 15, resulting in a torsion characteristic having low rigidity and low hysteresis torque. The gap angles of the first stopper 9 and third stopper 12 both decrease by 3 degrees. When the spline hub 3 is twisted 4.5 degrees further from the condition shown in FIG. 11 relative to the input rotary member 2, the mechanism shifts to the condition shown in FIG. 12. During this shift as well, the first springs 7 are compressed in the rotational direction between the spline hub 3 and the hub flange 6 and sliding occurs in the small friction mechanism 15. In FIG. 12, the spline hub 3 and friction plate 11 are touching each other by way of the third stopper 12 because the spline hub has been twisted over the full range of the second gap angle $\theta 2p$ in the R2 direction from the neutral condition shown in FIG. 10. Here, a gap angle equal to the difference between the first gap angle $\theta 1p$ of the first stopper 9 and the second gap angle $\theta 2p$ of third stopper 12 is secured in the first stopper 9. When the spline hub 3 is twisted 0.5 degree ($\theta 1p - \theta 2p$) in the R2 direction relative to the input rotary member 2 from the condition shown in FIG. 12, the mechanism shifts to the condition shown in FIG. 13. During this shift, sliding occurs in the large friction mechanism 13 and a large hysteresis torque is generated. Consequently, a region of low rigidity and high hysteresis torque is formed at the end of the region of low rigidity and low hysteresis torque. Meanwhile, the friction plates 11 and 11' rotate integrally with the spline hub 3 and move in the R2 direction with respect to the hub flange 6. In other words, the pins 62 move in the R2 direction inside holes 69 and touch against the R2 side of holes 69 (FIG. 8). In FIG. 13, the external teeth 55 of the spline hub 3 and the internal teeth 59 of the hub flange 6 touch against each other in the first stopper 9 and the pins 62 touch against the R2 sides of holes 69 in fourth stopper 14. Thus, there is no longer a rotational gap between the friction plates 11 and the hub flange 6. In FIG. 13, the first springs 7 cannot be compressed any further because the teeth of the first stopper 9 are touching against one another. When the spline hub 3 is twisted still further in the R2 direction from the condition shown in FIG. 13 relative to the input rotary member 2, the mechanism shifts to the condition shown in FIG. 14. During this shift, the hub flange 6 compresses the second springs 8 against the input rotary member 2. Here, friction is generated in the large friction mechanism 13 because sliding occurs between the friction plates 11 and the input rotary member 2. As a result, a characteristic having high rigidity and high hysteresis torque is obtained.

At this angle in the second stage, there is no rotational gap secured between the friction plates 11 and the hub flange 6. Consequently, when torsional vibrations are inputted, the elastic force of the second springs 8 acts on the friction plates 11 immediately when the second springs 8 elongate from their compressed condition and cause sliding to occur in the large friction mechanism 13.

Figure 9:
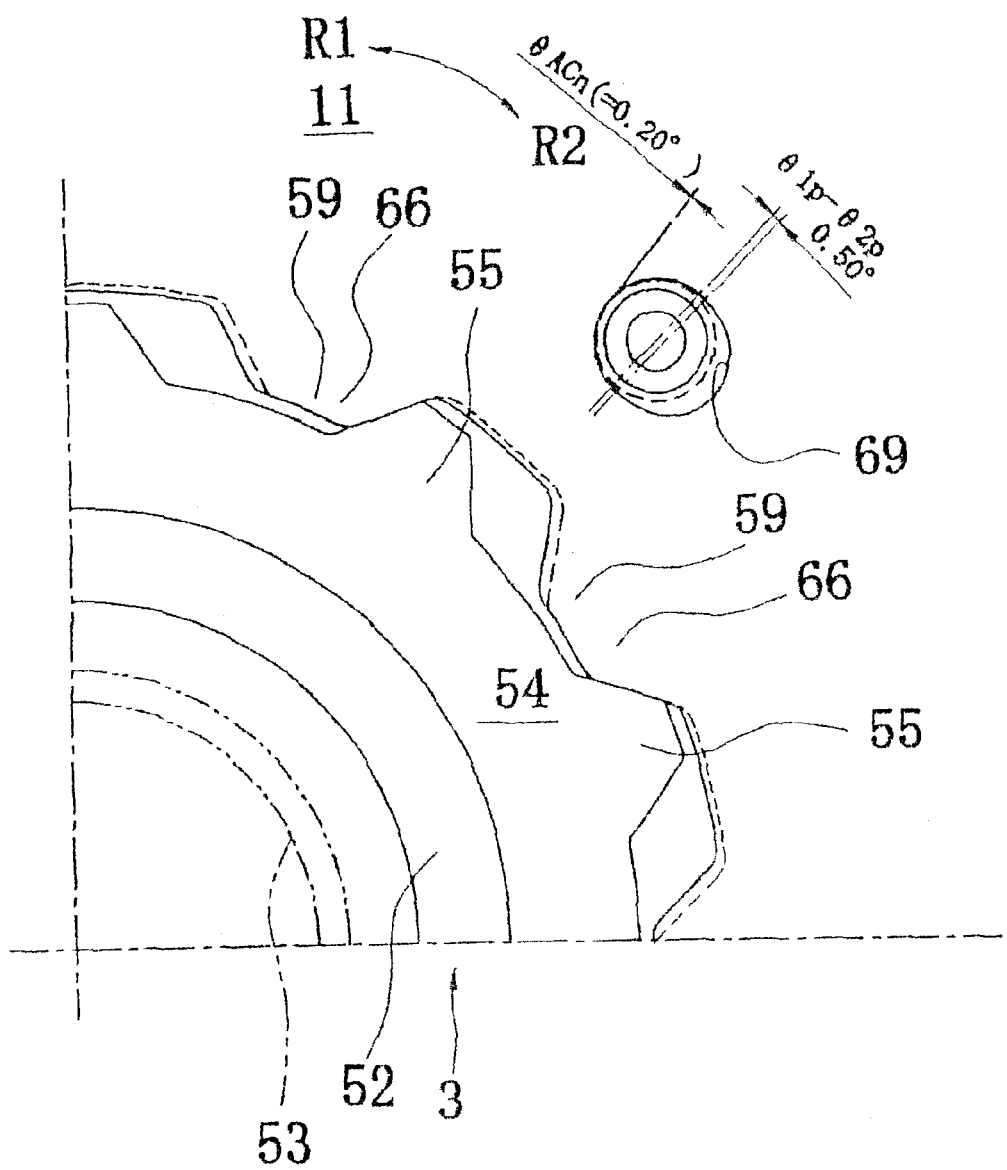
FIG. 9 is yet another enlarged partial elevational view illustrating twisting angles of the components.
Figure 16:
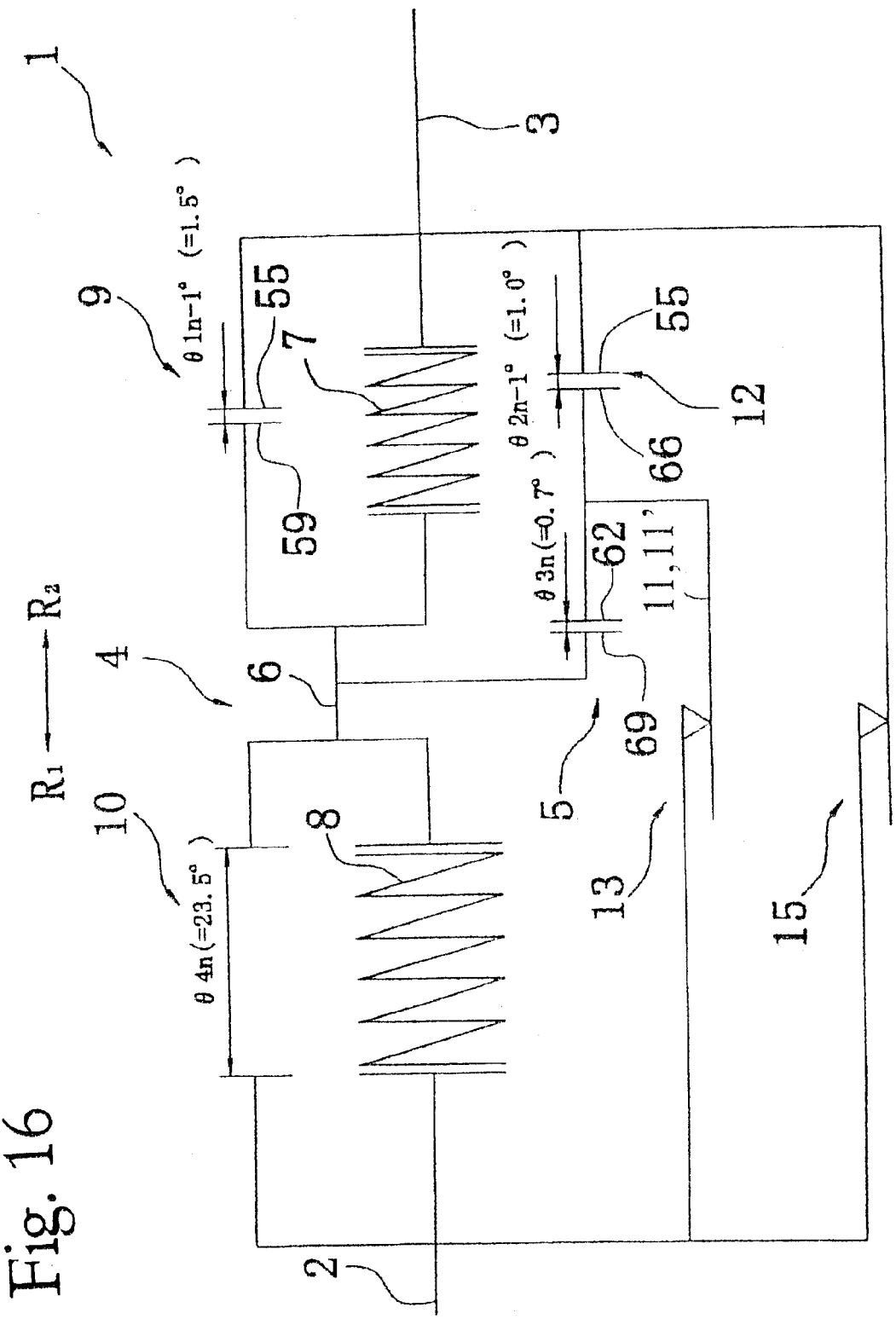
FIG. 16 is a mechanical circuit diagrammatical view of the damper mechanism of the clutch disk assembly.
Figure 17:
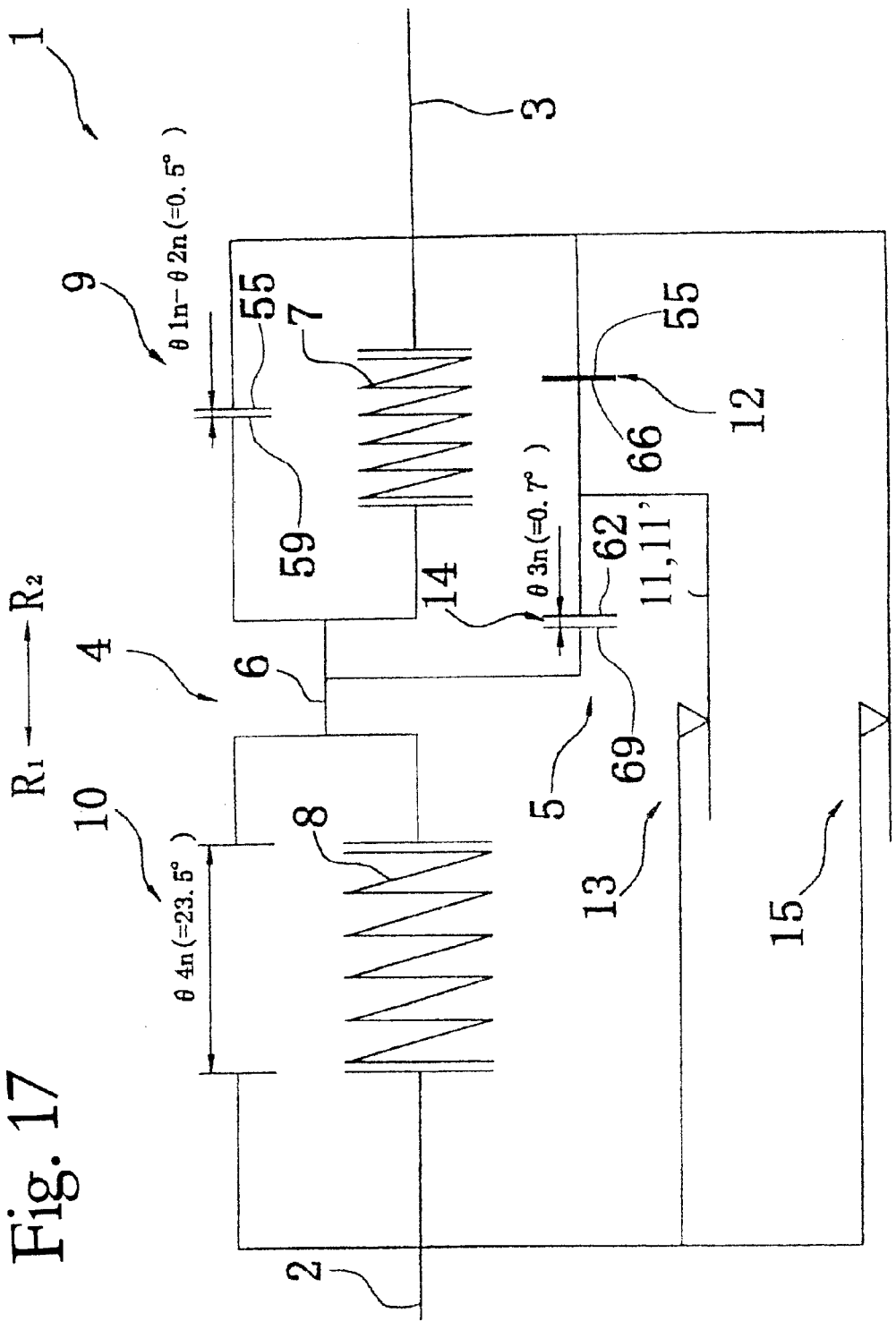
FIG. 17 is a mechanical circuit diagrammatical view of the damper mechanism of the clutch disk assembly.

Next, the operation of the damper mechanism is explained for a case in which the spline hub 3 is twisted in the R1 direction with respect to the input rotary member 2 from the neutral condition shown in FIG. 15. In this case, the input rotary member 2 twists in the R2 direction, i.e., in the direction opposite the rotational drive direction, with respect to the spline hub 3. When the spline hub 3 is twisted 1 degree in the R1 direction with respect to the input rotary member 2 from the condition shown in FIG. 15, the mechanism shifts to the condition shown in FIG. 16. During this shift, the first springs 7 are compressed in the rotational direction between the spline hub 3 and the hub flange 6. Sliding occurs in the small friction mechanism 15, resulting in a characteristic having low rigidity and low hysteresis torque. In FIG. 16, the gap angles of the first stopper 9 and third stopper 12 both decrease by 1 degree. When the spline hub 3 is twisted 1 degree further in the R1 direction with respect to the input rotary member 2 from the condition shown in FIG. 16, the mechanism shifts to the condition shown in FIG. 17. During this shift as well, the first springs 7 are compressed between the spline hub 3 and the hub flange 6 and sliding occurs in the small friction mechanism 15. In FIG. 17, the spline hub 3 and the friction plates 11 and 11' are touching each other by way of the third stopper 12 because the spline hub has been twisted over the range of the second gap angle θ2n degrees in the R1 direction from the neutral condition shown in FIG. 15. Here, a gap angle equal to the difference between the first gap angle θ1n of the first stopper 9 and the second gap angle θ2n of third stopper 12 is secured in the first stopper 9. When the spline hub 3 is twisted 0.5 degree (θ1n−θ2n) in the R1 direction with respect to the input rotary member 2 from the condition shown in FIG. 17, the mechanism shifts to the condition shown in FIG. 18. During this shift, sliding occurs in the large friction mechanism 13 and a large hysteresis torque is generated. Consequently, a region of low rigidity and high hysteresis torque is formed at the end of the region of low rigidity and low hysteresis torque. Meanwhile, the friction plates 11 rotate integrally with the spline hub 3 and move rotationally with respect to the hub flange 6. In other words, the pins 62 move in the R1 direction inside the holes 69. In FIG. 18, the spline hub 3 and the hub flange 6 touch each other in the first stopper 9 and, consequently, the first springs 7 cannot be compressed any further. In the condition shown in FIG. 18, the negative-side second stage gap angle θACn (0.2 degree) is formed in fourth stopper 14 (FIG. 9). As stated the negative-side second stage gap angle θACn is the angle obtained when the difference between the first gap angle θ1n and the second gap angle θ2n is subtracted from the third gap angle θ3n. When the spline hub 3 is twisted still further in the R1 direction with respect to the input rotary member 2 from the condition shown in FIG. 18, the mechanism shifts to the condition shown in FIG. 19. During this shift, the second springs 8 are compressed in the rotational direction and, simultaneously, sliding occurs in the large friction mechanism 13. As a result, a characteristic having high rigidity and high hysteresis torque is obtained. Since the friction plates 11 rotate as a single unit with the hub flange 6, the negative-side second stage gap angle θACn continues to be secured in the fourth stopper 14 during the shift from the condition shown in FIG. 18 to that shown in FIG. 19. If torsional vibrations are inputted when the mechanism is in the condition shown in FIG. 19, the second springs 8 will repeatedly elongate from and return to their contracted condition. When the second springs 8 elongate, the elastic force of the second springs 8 will not act on the friction plates 11 within the range of θACn and, as a result, sliding will not occur in the large friction mechanism 13. Thus, the negative-side second stage gap angle θACn functions as a friction suppressing mechanism that prevents sliding from occurring in the large friction mechanism 13 when minute torsional vibrations occur while the damping mechanism is operating at the second stage on the negative side of the torsion characteristic.

Figure 20:
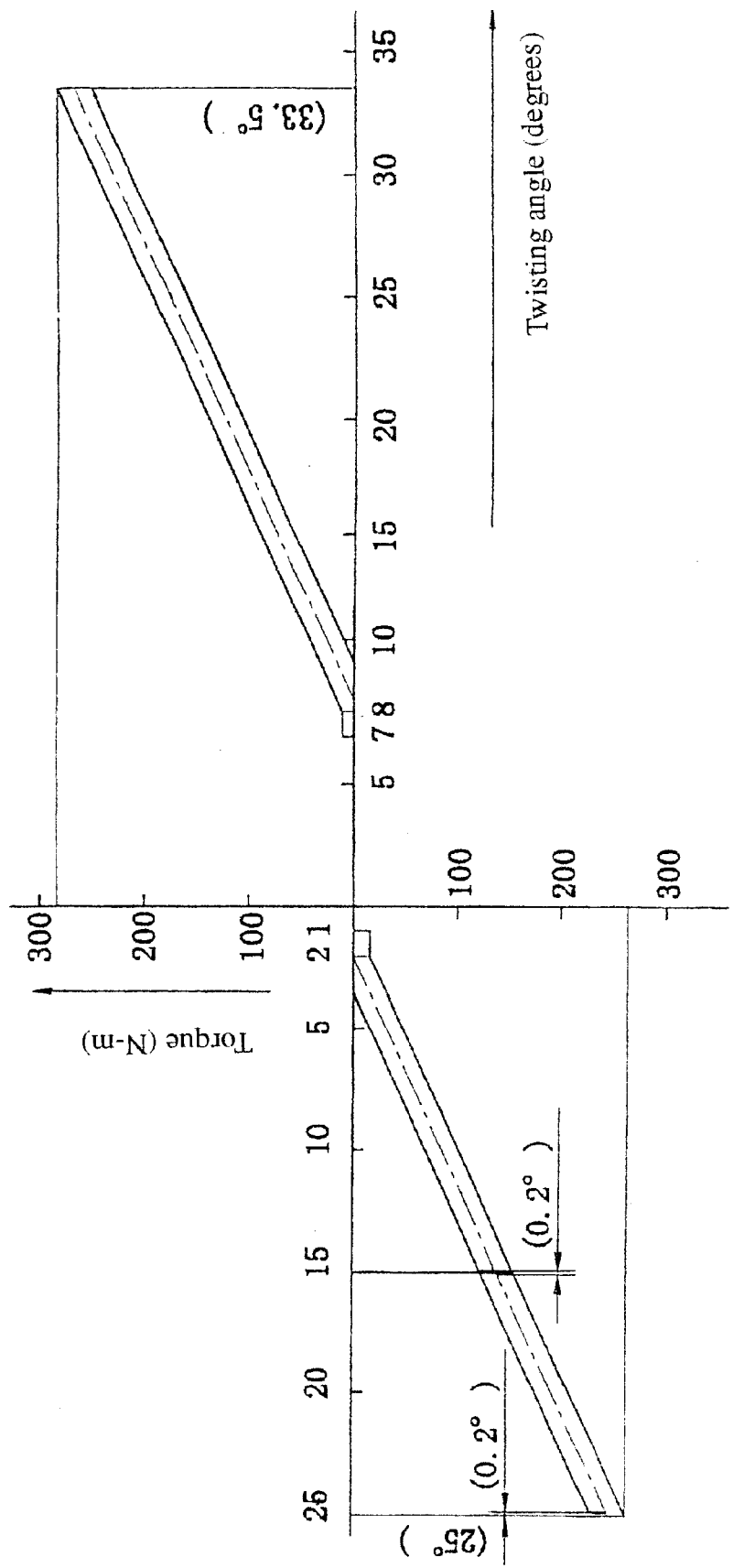
FIG. 20 is a diagrammatical view illustrating a torsion characteristic curve for the damper mechanism.

Next, the changes that occur in the torsion characteristic of the clutch disk assembly 1 in response to different types of torsional vibrations are described in detail using the torsion characteristic curves shown in FIG. 20. When torsional vibrations having a large amplitude, such as longitudinal vibrations of the vehicle, occur, the damper mechanism fluctuates repeatedly between the second stages on the positive and negative sides of the torsion characteristic. In such a case, the longitudinal vibrations of the vehicle are immediately damped by the high hysteresis torque of the second stages.

Figure 21:
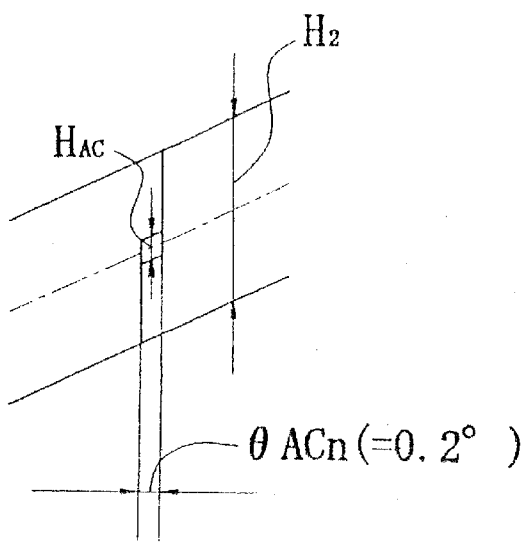
FIG. 21 is view of an enlarged partial view of FIG. 20.

Next consider a case in which engine combustion fluctuations cause minute torsional vibrations to be delivered to the clutch disk assembly 1 when, for example, the vehicle is being decelerated by engine braking. In this case, as shown in FIG. 21, the spline hub 3 and the input rotary member 2 can rotate relative to each other within the range of negative-side second stage gap angle θACn without operating the large friction mechanism 13. That is, within the limits of gap angle θACn on the torsional characteristic curve, the second springs 8 operate but the large friction mechanism 13 does not slide. Within the range of twisting angles represented by θACn, a hysteresis torque $H_{AC}$ is obtained which is smaller a hysteresis torque $H_2$ of the second stage. It is preferred that the hysteresis torque $H_{AC}$ has approximately one-tenth the magnitude of hysteresis torque $H_2$. Thus, since a rotational gap that prevents operation of the large friction mechanism 13 within a prescribed angular range is provided on the negative side of the torsion characteristic, the peak that occurs at the resonance rotational speed when engine combustion fluctuations occur due to deceleration by engine braking can be reduced.

A rotational gap that prevents operation of large frictional mechanism 13 within a prescribed angular range was not provided on the positive side of the torsion characteristic. Consequently, degradation of the noise and vibration performance in the vicinity of the resonance rotational speed does not occur in FF vehicles, in which a resonance peak often remains in the region of practical engine speeds. Thus, the noise and vibration performance are improved during both acceleration and deceleration by securing a rotational gap that prevents operation of the friction mechanism within a prescribed angular range on only one side, i.e., positive or negative, of the torsion characteristic.

The damper mechanism of the present invention can be applied to devices other than clutch disk assemblies. For example, it can be used as a damper mechanism that elastically couples two flywheels in a rotational direction.

WORKING EXAMPLE

The noise level was compared for a case in which the damper mechanism of the present invention was used in a FF vehicle and a case in which a damper mechanism having another structure was used in a FF vehicle.

(1) Vibration Level During Acceleration

Figure 22:
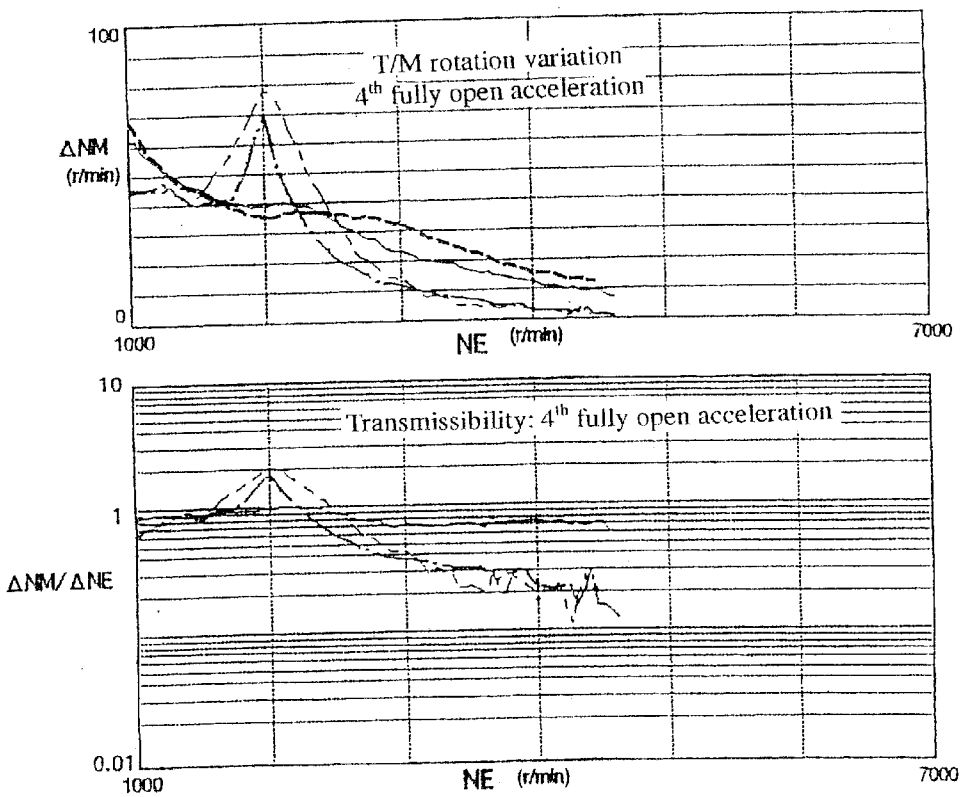
FIG. 22 is view of a graph for the working examples showing the change in the transmission rotational speed variation (ΔNM) with respect to the engine speed (NE) when accelerating with a fully open throttle in fourth gear.

The upper graph of FIG. 22 shows the change in the transmission rotational speed variation, represented as ΔNM, with respect to the engine speed, represented as NE, when accelerating with a wide-open throttle in fourth gear. The lower graph of FIG. 22 shows the change in the transmissibility, represented as ΔNM/ΔNE, with respect to the engine speed (NE) when accelerating wide-open in fourth gear. The thick dotted line on the graph represents the variation in engine speed and the double-dot chain line represents a conventional structure (i.e., a structure in which a rotational gap that occupies a very small twisting angle is formed on the positive side of the torsion characteristic). In the conventional structure, a large resonance peak appears in the vicinity of an engine speed of 2000 rpm, indicating that a large degree of noise is occurring.

A first working example and a second working example of a structure in accordance with the present invention (i.e., a structure in which a rotational gap that occupies a very small twisting angle is not formed on the positive side of the torsion characteristic but exists on the negative side) are indicated with a single-dot chain line and a solid line, respectively. With the structure of the first working example (single-dot chain line), the hysteresis torque is relatively small and the peak at the resonance point is smaller than that of the conventional structure. Thus, as shown in the lower graph of FIG. 22, the transmissibility is 1 or less everywhere except the resonance point. Even at the resonance point, however, the transmissibility is less than that of the conventional structure. With the structure of the second working example (solid line), the hysteresis torque is relatively large and the peak at the resonance point almost disappears such that the transmission rotational speed variation almost matches the engine speed variation. As a result, as shown in the lower graph of FIG. 22, the transmissibility is 1 or less across almost the entire plot and is roughly 1 or less even in the vicinity of the resonance point.

Therefore, compared to a conventional structure, a structure in accordance with the present invention can greatly reduce the variation of the transmission rotational speed, i.e., the noise level, during acceleration in a FF vehicle.

(2) Vibration Level During Deceleration

Figure 23:
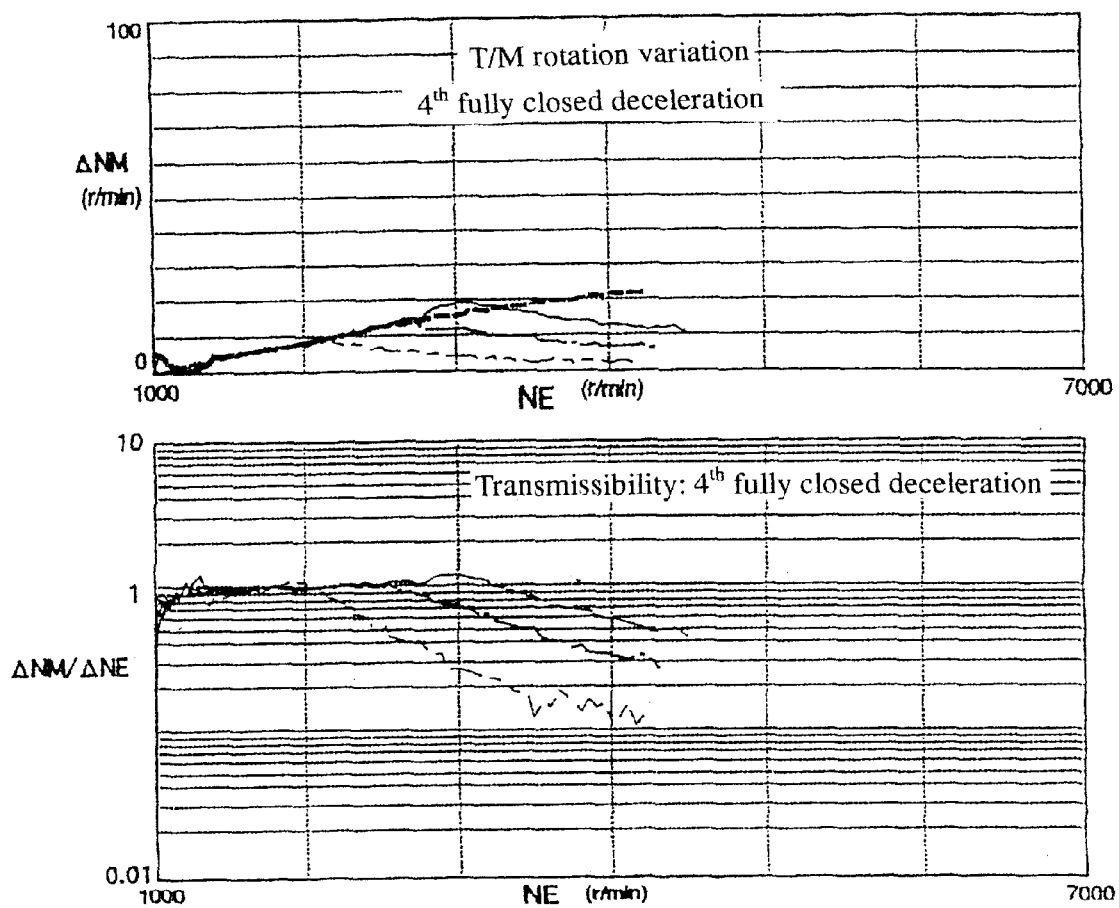
FIG. 23 is view of a graph showing the change in the transmission rotational speed variation (ΔNM) with respect to the engine speed (NE) when decelerating with a fully closed throttle in fourth gear.

The upper graph of FIG. 23 shows the change in the transmission rotational speed variation ($\Delta$NM) with respect to the engine speed (NE) when decelerating with a fully closed throttle in fourth gear. The lower graph of FIG. 23 shows the change in the transmissibility ($\Delta$NM/$\Delta$NE) with respect to the engine speed (NE) when decelerating with a fully closed throttle in fourth gear. The thick dotted line on the graph represents the variation in engine speed. A first working example and a second working example of a structure in which a rotational gap that occupies a very small twisting angle is not formed on the negative side of the torsion characteristic are indicated with a single-dot chain line and a solid line, respectively. The structure of the first working example (single-dot chain line) has a relatively small hysteresis torque and the structure of the second working example (solid line) has a relatively large hysteresis torque. In both working examples, the transmission rotational speed variation is somewhat smaller with respect to the engine speed variation.

The double-dot chain line represents a structure corresponding to the present invention and has a rotational gap that occupies a very small twisting angle on the negative side of the torsion characteristic. With this structure, the transmission rotational speed variation is greatly reduced with respect to the engine speed variation. In other words, the transmissibility is greatly reduced in comparison with conventional structures. The reduction is particularly marked in between 2000 and 4000 rpm. Therefore, compared to other structures, the structure in accordance with the present invention can greatly reduce the rotational speed variation of the transmission, i.e., the noise level, during deceleration in a FF vehicle.

(3) Summary of Experimental Results

Based on the experimental results just presented, the present invention suppresses the noise level during deceleration by securing a minute rotational gap angle on the left or negative side of the torsion characteristic in the same manner as the prior art and also reduces or eliminates the resonance peak that occurs during acceleration by eliminating the minute rotational gap angle on the positive side of the torsion characteristic, a feature that differs from the prior art. As a result, the noise and vibration performance during both acceleration and deceleration are improved and an overall superior vibration damping performance is achieved.

EFFECTS OF THE INVENTION

A damper mechanism in accordance with the present invention has a rotational gap for preventing the operation of the friction mechanism on only one side, i.e., the positive or negative side, of its torsion characteristic. Therefore, the noise and vibration performance can be improved for both acceleration and deceleration by providing a rotational gap for preventing the operation of the friction mechanism on only either the positive side or the negative side of the torsion characteristic in accordance with the specific properties of the vehicle.

The terms of degree such as "substantially," "about," and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2001-67421. The entire disclosure of Japanese Patent Application No. 2001-67421 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A damper mechanism comprising:
    an input rotary member;
    an output rotary member being configured to rotate relative to said input rotary member;
    a damper section having,
        a spring member being configured to couple rotationally said input rotary member and said output rotary member, and
        a torsion characteristic including a positive side corresponding to said input rotary member being twisted in a rotational drive direction with respect to said output rotary member and a negative side corresponding to said input rotary member being twisted in the direction opposite said rotational drive direction with respect to said output rotary member;
    a friction mechanism being configured to generate friction when said input rotary member and said output rotary member rotate relative to each other and said spring member exerts an elastic force; and
    a friction suppressing mechanism being configured to prevent by a rotational gap said elastic force of said spring member from acting on said friction mechanism within a prescribed angular range, said friction suppressing mechanism being configured to secure said rotational gap only on the negative side of said torsion characteristic.

2. The damper mechanism according to claim 1, wherein said torsion characteristic further includes a first stage and a second stage, said second stage has a higher rigidity than said first stage, and
    in said rotational gap a hysteresis torque is obtained that is smaller than a hysteresis torque of said second stage.

3. The damper mechanism according to claim 2, wherein said hysteresis torque of said rotational gap is approximately one-tenth said hysteresis torque of said second stage.

4. A damper mechanism comprising:
   an input rotary member;
   an output rotary member being disposed to rotate relative to said input rotary member;
   a damper mechanism having
      a spring member being configured to couple rotationally said input rotary member and said output rotary member, and
      a torsion characteristic having
         a positive side corresponding to said input rotary member being twisted in a rotational drive direction with respect to said output rotary member,
         a negative side corresponding to said input rotary member being twisted in a direction opposite said rotational drive direction with respect to said output rotary member,
         a first stage, and
         a second stage corresponding to said spring member being compressed, said second stage having a higher rigidity than said first stage, said second stage existing on both said positive side and said negative side;
   a friction mechanism being configured to generate friction when said input rotary member and said output rotary member rotate relative to each other within said second stage and said spring member exerts an elastic force; and
   a friction suppressing mechanism being configured to secure a rotational gap only in said second stage on said positive side or said second stage on said negative side of said torsion characteristic, said friction suppressing mechanism being configured to prevent said elastic force of said spring member from acting on said friction mechanism within a prescribed angular range.

5. The damper mechanism according to claim 4, wherein said friction suppressing mechanism secures said rotational gap only in said second stage on said negative side of said torsion characteristic.

6. The damper mechanism according to claim 5, wherein in said rotational gap a hysteresis torque is obtained that is smaller than a hysteresis torque of said second stage, said hysteresis torque of said rotational gap is approximately one-tenth said hysteresis torque of said second stage.

7. A clutch disk assembly being configured to transfer torque from an engine and dampen vibrations from a flywheel, the clutch disk assembly comprising:
   an input rotary member;
   an output rotary member being disposed to rotate relative to said input rotary member;
   a hub flange being disposed between said input rotary member and said output rotary member;
   a first elastic member being configured to couple elastically said output rotary member and said hub flange in a rotational direction, said first elastic member being configured to compress in a first stage of relative rotation between said output rotary member and said input rotary member;
   a second elastic member being configured to couple elastically said input rotary member and said hub flange in said rotational direction, said second elastic member being configured to compress in series with said first elastic member, said second elastic member having a higher rigidity than said first elastic member, said second elastic member being configured to compress in a second stage of relative rotation between said output rotary member and said input rotary member;
   a friction mechanism being configured to generate friction when said input rotary member and said output rotary member rotate relative to each other within said second stage and said second elastic member exerts an elastic force; and
   a friction suppressing mechanism being configured to secure a rotational gap only in said second stage on a positive side or said second stage on a negative side of relative rotation between said input rotary member and said output rotary member, said friction suppressing mechanism being configured to prevent elastic force of said second member from acting on a friction mechanism within a prescribed angular range.

8. The clutch disk assembly according to claim 7, wherein said friction suppressing mechanism secures said rotational gap only in said second stage on said negative side of relative rotation between said input rotary member and said output rotary member.

9. The clutch disk assembly according to claim 8, wherein said rotational gap is less than one degree.

10. The clutch disk assembly according to claim 9, wherein said rotational gap is between 0.15 and 0.25 degree.

11. The clutch disk assembly according to claim 10, wherein said rotational gap is 0.2 degree.

12. The clutch disk assembly according to claim 8, wherein in said rotational gap a hysteresis torque is obtained that is smaller than a hysteresis torque of said second stage.

13. The clutch disk assembly according to claim 12, wherein said hysteresis torque of said rotational gap angle is approximately one-tenth said hysteresis torque of said second stage.

14. The clutch disk assembly according to claim 8, wherein said friction suppressing mechanism comprises a hole formed in said hub flange and a pin arranged inside said hole, said pin is configured to move within and relative to said hole.

15. The clutch disk assembly according to claim 14, wherein said pin is fixed to said input rotary member.

16. The clutch disk assembly according to claim 15, wherein said pin and said hole are circular in a radial direction.

17. The clutch disk assembly according to claim 16, wherein in a clutch disk assembly neutral position a circular center of said pin and a circular center of said hole are misaligned in said radial direction.

18. The clutch disk assembly according to claim 17, wherein in said clutch disk assembly neutral position said circular center of said pin is closer to a negative relative rotation side of said hole.

19. The clutch disk assembly according to claim 7, wherein
   a first gap is provided in said rotational direction between said output rotary member and said hub flange,
   a second gap is provided in said rotational direction between said output rotary member and said friction mechanism, and
   said rotational gap is equal to the difference between said first gap and said second gap.

* * * * *